(12) United States Patent
Jung et al.

(10) Patent No.: US 8,949,494 B2
(45) Date of Patent: Feb. 3, 2015

(54) USER EQUIPMENT CONNECTABLE TO AN EXTERNAL DEVICE

(75) Inventors: Jae-Hun Jung, Gyeonggi-do (KR); Shin-Hyuk Kang, Seoul (KR); You-Jin Kang, Seoul (KR); Byeong-Tae Kim, Gyeonggi-do (KR); Jung-Wook Lee, Gyeonggi-do (KR); Hyuk-Jun Jung, Gyeonggi-do (KR); Jae-Uk Cha, Gyeonggi-do (KR)

(73) Assignee: KT Corporation, Gyeonggi-do (KR)

( * ) Notice: Subject to any disclaimer, the term of this patent is extended or adjusted under 35 U.S.C. 154(b) by 0 days.

(21) Appl. No.: 13/540,112

(22) Filed: Jul. 2, 2012

(65) Prior Publication Data

US 2013/0007301 A1    Jan. 3, 2013

(30) Foreign Application Priority Data

Jun. 30, 2011 (KR) .................. 10-2011-0065107
Nov. 7, 2011 (KR) .................. 10-2011-0115326

(51) Int. Cl.
  G06F 3/01    (2006.01)
  G06F 1/16    (2006.01)
  G06F 13/40   (2006.01)

(52) U.S. Cl.
  CPC .......... G06F 1/1632 (2013.01); G06F 13/4081 (2013.01)
  USPC ............................................. 710/72; 710/62

(58) Field of Classification Search
  None
  See application file for complete search history.

(56) References Cited

U.S. PATENT DOCUMENTS

| 5,832,471 | A | 11/1998 | Fukui | |
| 5,875,312 | A * | 2/1999 | Walsh et al. | 710/303 |
| 6,286,066 | B1 * | 9/2001 | Hayes et al. | 710/302 |
| 6,401,157 | B1 * | 6/2002 | Nguyen et al. | 710/302 |
| 6,516,367 | B1 * | 2/2003 | Barenys et al. | 710/109 |
| 6,535,947 | B1 * | 3/2003 | Amoni et al. | 710/305 |

(Continued)

FOREIGN PATENT DOCUMENTS

| JP | 2003-316563 A | 11/2003 |
| JP | 2005-284657 A | 10/2005 |

(Continued)

OTHER PUBLICATIONS

Daniel Lawson NPL Oct. 2011—How to turn off notification; src: http://apple.stackexchange.com/questions/28883/how-can-i-turn-off-push-notifications-for-individual-apps-in-ios-5; obtained date: Aug. 26, 2014.

*Primary Examiner* — Cheng-Yuan Tseng
(74) *Attorney, Agent, or Firm* — IP Legal Services, LLC

(57) ABSTRACT

Provided are user equipment connectable to an external device and a method for establishing a connection between user equipment including second constituent elements and an external device including first constituent elements and controlling the external device. The method may include sensing the connection to the external device, obtaining first constituent element information from the external device through the connection, wherein the first constituent element information includes information on first constituent elements of the external device, selecting target constituent elements to control from the first constituent elements of the external device based on the obtained first constituent element information, reconfiguring a control path for controlling the selected target constituent elements of the external device, and controlling the selected target constituent elements of the external device through the reconfigured control path.

18 Claims, 13 Drawing Sheets

6010

| Constituent element | Identification number |
|---|---|
| Wireless communication unit | 1 |
| Microphone | 2 |
| Camera | 3 |
| Luminance sensor | 4 |
| Accelaration sensor | 5 |
| Keypad input unit | 6 |
| Touch screen | 7 |
| Display unit | 8 |
| Audio output unit | 9 |
| Backlight device | 10 |
| Internal memory | 11 |

6020

| Constituent element | Identification number |
|---|---|
| Microphone | 2 |
| Luminance sensor | 4 |
| Accelaration sensor | 5 |
| Touch screen | 7 |
| Audio output unit | 9 |
| Backlight device | 10 |
| Internal memory | 11 |
| External memory | 12 |

(56) References Cited

U.S. PATENT DOCUMENTS

| | | | |
|---|---|---|---|
| 6,600,840 B1 | 7/2003 | McCrossin et al. | |
| 6,697,892 B1 | 2/2004 | Laity et al. | |
| 6,804,740 B1 * | 10/2004 | Watts, Jr. | 710/303 |
| 6,862,724 B1 | 3/2005 | Riley et al. | |
| 6,915,368 B2 * | 7/2005 | Lin | 710/302 |
| 6,934,788 B2 | 8/2005 | Laity et al. | |
| 7,076,536 B2 * | 7/2006 | Chiloyan et al. | 709/220 |
| 7,117,388 B2 * | 10/2006 | Arimilli et al. | 714/10 |
| 7,165,109 B2 * | 1/2007 | Chiloyan et al. | 709/227 |
| 7,196,676 B2 | 3/2007 | Nakamura et al. | |
| 7,199,787 B2 | 4/2007 | Lee et al. | |
| 7,228,366 B2 | 6/2007 | Abramson et al. | |
| 7,312,764 B2 | 12/2007 | Driver et al. | |
| 7,386,868 B2 * | 6/2008 | McCormack | 720/657 |
| 7,533,408 B1 * | 5/2009 | Arnouse | 726/9 |
| 7,685,322 B2 * | 3/2010 | Bhesania et al. | 710/8 |
| 7,853,944 B2 * | 12/2010 | Choe | 717/173 |
| 7,884,836 B2 * | 2/2011 | Hussain | 345/649 |
| 8,214,545 B2 | 7/2012 | Khan et al. | |
| 8,250,277 B2 | 8/2012 | Tseng et al. | |
| 8,281,366 B1 | 10/2012 | McCorkendale et al. | |
| 2002/0083228 A1 | 6/2002 | Chiloyan et al. | |
| 2002/0121548 A1 | 9/2002 | Lu | |
| 2003/0231143 A1 | 12/2003 | Nakamura et al. | |
| 2004/0006690 A1 | 1/2004 | Du et al. | |
| 2004/0160193 A1 | 8/2004 | Cha et al. | |
| 2004/0210321 A1 * | 10/2004 | Hayashi et al. | 700/11 |
| 2004/0218036 A1 | 11/2004 | Boss et al. | |
| 2004/0266425 A1 * | 12/2004 | Gonsalves et al. | 455/426.2 |
| 2005/0068252 A1 | 3/2005 | Driver et al. | |
| 2005/0257052 A1 | 11/2005 | Asai et al. | |
| 2006/0036788 A1 | 2/2006 | Galang et al. | |
| 2006/0132473 A1 | 6/2006 | Fuller et al. | |
| 2006/0190652 A1 | 8/2006 | Keely et al. | |
| 2007/0077965 A1 | 4/2007 | Fox | |
| 2007/0171239 A1 | 7/2007 | Hunt et al. | |
| 2007/0257927 A1 | 11/2007 | Sakanishi et al. | |
| 2008/0152305 A1 | 6/2008 | Ziegler | |
| 2008/0303746 A1 | 12/2008 | Schlottmann et al. | |
| 2009/0049554 A1 | 2/2009 | Vuong et al. | |
| 2009/0109822 A1 | 4/2009 | Hung | |
| 2009/0163139 A1 | 6/2009 | Wright-Riley | |
| 2009/0178097 A1 | 7/2009 | Kim et al. | |
| 2009/0231485 A1 | 9/2009 | Steinke | |
| 2010/0064228 A1 | 3/2010 | Tsern | |
| 2010/0064248 A1 | 3/2010 | Lee et al. | |
| 2010/0066698 A1 | 3/2010 | Seo | |
| 2010/0251243 A1 | 9/2010 | Gill et al. | |
| 2010/0265652 A1 | 10/2010 | Agata et al. | |
| 2010/0318709 A1 | 12/2010 | Bell et al. | |
| 2011/0034242 A1 | 2/2011 | Aronzon et al. | |
| 2011/0037711 A1 | 2/2011 | Siddiqui et al. | |
| 2011/0102554 A1 | 5/2011 | Saito et al. | |
| 2011/0134047 A1 | 6/2011 | Wigdor et al. | |
| 2011/0138327 A1 | 6/2011 | Scott et al. | |
| 2011/0202872 A1 | 8/2011 | Park | |
| 2011/0275391 A1 | 11/2011 | Lee et al. | |
| 2011/0285916 A1 | 11/2011 | Takiduka | |
| 2011/0296308 A1 | 12/2011 | Yi | |
| 2012/0050183 A1 | 3/2012 | Lee | |
| 2012/0050331 A1 | 3/2012 | Kanda | |
| 2012/0088548 A1 | 4/2012 | Yun et al. | |
| 2012/0117167 A1 | 5/2012 | Sadja et al. | |
| 2012/0172088 A1 | 7/2012 | Kirch et al. | |
| 2012/0297207 A1 | 11/2012 | Carlsen et al. | |
| 2013/0033414 A1 | 2/2013 | Zheng et al. | |
| 2013/0089202 A1 | 4/2013 | Altmann | |
| 2013/0104149 A1 | 4/2013 | Ahn et al. | |
| 2014/0208276 A1 | 7/2014 | Park | |

FOREIGN PATENT DOCUMENTS

| | | | |
|---|---|---|---|
| JP | 2006-094367 A | 4/2006 | |
| JP | 2008-158342 A | 7/2008 | |
| KR | 20-0290286 Y1 | 9/2002 | |
| KR | 10-2004-0074759 A | 8/2004 | |
| KR | 10-0487618 B1 | 5/2005 | |
| KR | 10-2005-0096578 A | 10/2005 | |
| KR | 10-2006-0018083 A | 2/2006 | |
| KR | 10-2008-0027813 A | 3/2008 | |
| KR | 10-2009-0092337 A | 8/2009 | |
| KR | 10-2010-0032660 A | 3/2010 | |
| KR | 10-2010-0039592 A | 4/2010 | |
| KR | 20-2010-0009920 U | 10/2010 | |
| KR | 10-2010-0128630 A | 12/2010 | |
| KR | 10-2010-0133243 A | 12/2010 | |
| KR | 10-2011-0030963 A | 3/2011 | |
| KR | 10-1017866 B1 | 3/2011 | |
| KR | 10-2011-0057930 A | 6/2011 | |
| KR | 10-2011-0093541 A | 8/2011 | |
| KR | 10-2011-0111857 A | 10/2011 | |
| KR | 10-2011-0115489 A | 10/2011 | |
| KR | 10-2011-0123348 A | 11/2011 | |
| KR | 10-2011-0131439 A | 12/2011 | |
| KR | 10-2011-0134495 A | 12/2011 | |

* cited by examiner

FIG. 1B
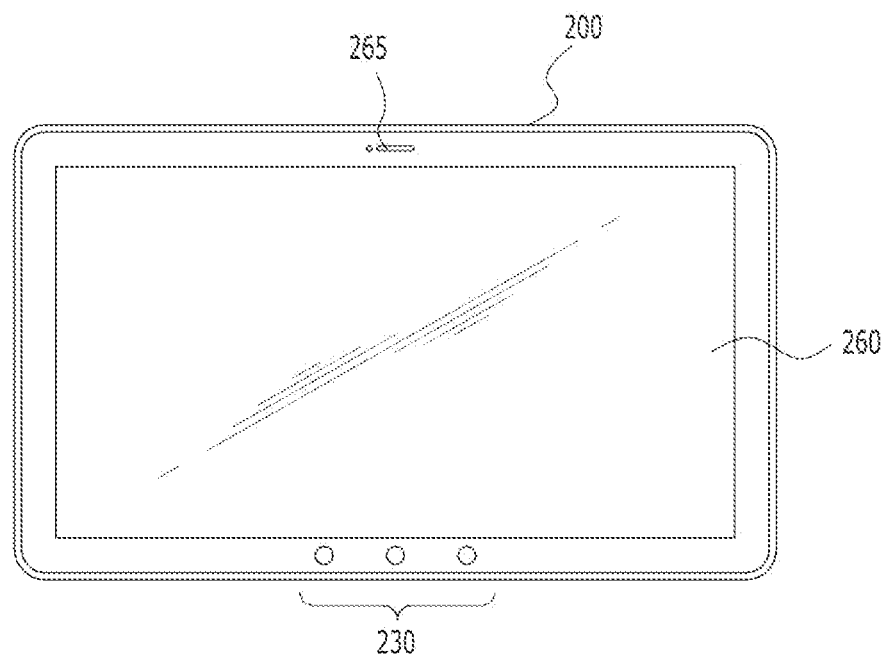
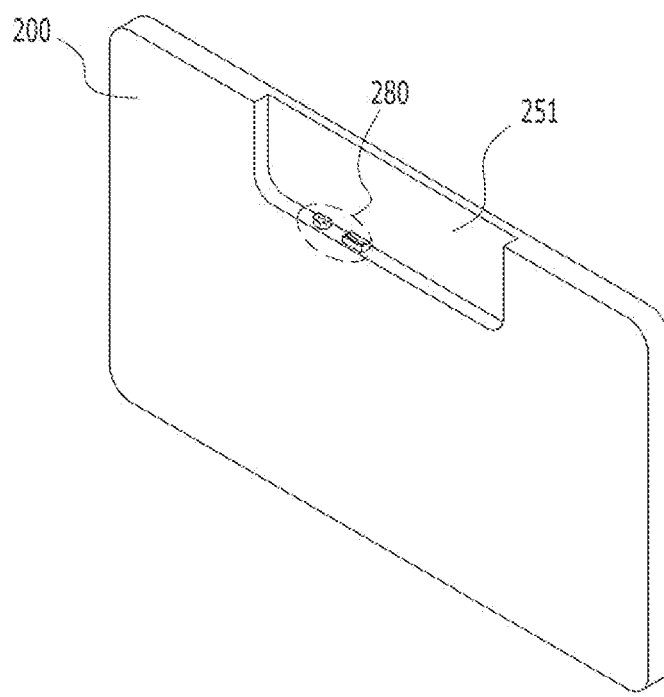

| Constituent element | Identification number |
|---|---|
| Wireless communication unit | 1 |
| Microphone | 2 |
| Camera | 3 |
| Luminance sensor | 4 |
| Accelaration sensor | 5 |
| Keypad input unit | 6 |
| Touch screen | 7 |
| Display unit | 8 |
| Audio output unit | 9 |
| Backlight device | 10 |
| Internal memory | 11 |

6020

| Constituent element | Identification number |
|---|---|
| Microphone | 2 |
| Luminance sensor | 4 |
| Accelaration sensor | 5 |
| Touch screen | 7 |
| Audio output unit | 9 |
| Backlight device | 10 |
| Internal memory | 11 |
| External memory | 12 |

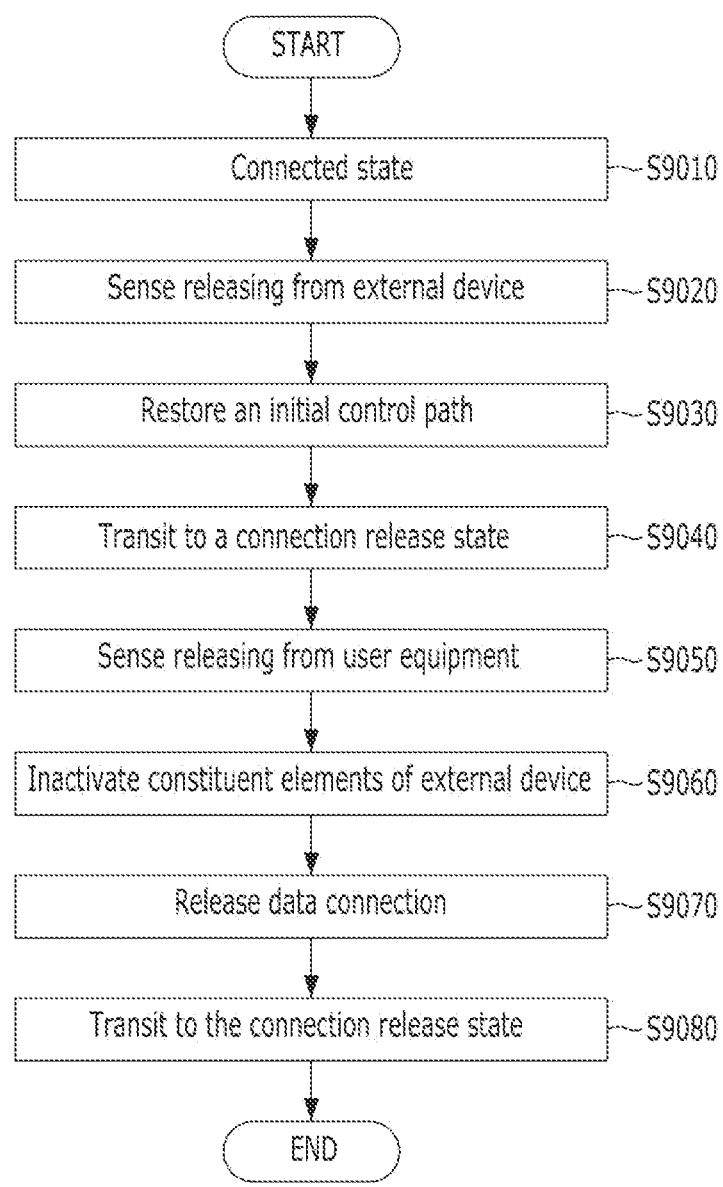

USER EQUIPMENT CONNECTABLE TO AN EXTERNAL DEVICE

CROSS REFERENCE TO PRIOR APPLICATIONS

The present application claims priority under 35 U.S.C. §119 to Korean Patent Application No. 10-2011-0065107 (filed on Jun. 30, 2011) and Korean Patent Application No. 10-2011-0115326 (filed on Nov. 7, 2011), which are hereby incorporated by reference in their entireties.

The subject matter of this application is related to U.S. patent application Ser. No. 13/460,091 filed Apr. 30, 2012, and U.S. patent application Ser. No. 13/539,929 filed Jul. 2, 2012, the teachings of which are incorporated herein in their entirety by reference.

FIELD OF THE INVENTION

The present invention relates to communications and in particular, to connecting user equipment with an external device and controlling constituent elements of external device through the user equipment.

BACKGROUND OF THE INVENTION

User equipment has advanced so as to perform multiple functions such as communicating voice and data with others; exchanging text messages or multimedia messages; sending e-mails; capturing a still or moving image; playing back a music or a video file, playing a game, and receiving a broadcast signal. Lately, such multi-functional user equipment has received greater attention for new applications. Instead of using multiple independent devices, a user prefers to use single multifunction-enabled user equipment. Portability and/or mobility should be considered in design of user equipment, but such user equipment has limitations in size. Accordingly, there also are limitations in display screen size, screen resolution, and speaker performance.

In order to overcome such limitations, an external device having a large display size, better speaker performance, and connectable to a mobile terminal has been introduced. Such external device connected to the mobile terminal can provide data, music files, and other content stored in the mobile terminal in better performance.

SUMMARY OF THE INVENTION

This summery is provided to introduce a selection of concepts in a simplified form that are further described below in the detailed description with reference to the drawings. This summary is not intended to identify key features or essential features of the claimed subject matter, nor is it intended to limit the scope of the claimed subject matter. Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, user equipment may be connected to an external device and control constituent elements of the external device.

In accordance with another aspect of the present invention, user equipment and external device may exchange information on constituent elements of the user equipment and the external device.

In accordance with another aspect of the present invention, user equipment may determine constituent elements of an external device, which have the same identification number compared to constituent elements of the user equipment.

In accordance with another aspect of the present invention, user equipment may reconfigure a control path to control constituent elements of the external device when user equipment is connected to the external device.

In accordance with an embodiment of the present invention, a method may be provided for establishing a connection between user equipment including second constituent elements and an external device including first constituent elements and controlling the external device. The method may include sensing the connection to the external device, obtaining first constituent element information from the external device through the connection, wherein the first constituent element information includes information on first constituent elements of the external device, selecting target constituent elements to control from the first constituent elements of the external device based on the obtained first constituent element information, reconfiguring a control path for controlling the selected target constituent elements of the external device, and controlling the selected target constituent elements of the external device through the reconfigured control path.

The sensing the connection to the external device may include supplying power to the external device when a coupling interface of the user equipment is physically connected to a corresponding coupling interface of the external device, receiving a signal from the external device in response to the supplied power, and determining the connection is established to the external device upon the receipt of the signal. The signal may be generated in hardware by returning a part of the supplied power through the coupling interfaces.

The first constituent element information may include a corresponding identification number for each first constituent element of the external device. In this case, the selecting target constituent elements may include comparing identification numbers of the first constituent elements with identification numbers of the second constituent elements using the first constituent information, selecting constituent elements having the same identification numbers from the first constituent elements as the comparison result, and determining the selected constituent elements as the target constituent elements to control.

The method may further include Obtaining operation setting of the second constituent elements and synchronizing operation setting of the selected target constituent elements with the obtained operating setting of the second constituent elements.

The reconfiguring a control path may include reconfiguring a command control path for transferring commands with associated data, generated in the user equipment, to at least one of the selected target constituent elements of the external device and reconfiguring an event control path for receiving event signals generated in at least one of the selected target constituent elements of the external device.

The controlling the selected target constituent elements of the external device may include generating the command with associated data, as results of performing associated applications installed in a controller of the user equipment, transmitting the generated command with associated data to at least one of the selected target constituent elements of the external device through the reconfigured command path, and outputting the associated data through at least one of the selected target constituent elements based on the command.

The controlling the selected target constituent elements of the external device may include receiving the event signal generated in at least one of the selected target constituent elements of the external device through the reconfigured event control path and performing an associated application in response to the event signal.

The method may further include activating the external device with the first constituent elements after sensing the connection established between the user equipment and the external device.

The method may further include inactivating the second constituent elements of the user equipment after the selecting target constituent elements.

The method may further include sensing releasing of the connection established between the user equipment and the external device, reconfiguring the reconfigured control path back to an original control path, and controlling the second constituent elements of the user equipment through the original control path.

The reconfiguring the reconfigured control path may include reconfiguring a command control path for transferring commands with associated data, generated in the user equipment, to at least one of the second constituent elements of the user equipment; and reconfiguring an event control path for receiving event signals generated in at least one of the second constituent elements of the user equipment.

In accordance with another embodiment of the present invention, user equipment may be connectable to an external device including first constituent elements. The user equipment may include a coupling interface, a plurality of second constituent elements, and a controller. The coupling interface may be configured to sense connection established to the external device. The plurality of second constituent elements each may be configured to perform an associated operation in response to at least one of a command and an event signal generated in response to an input from a user. The controller may be configured to control the first constituent elements of the external device by reconfiguring a control path for transferring commands with associated data, generated as results of operations and receiving event signals generated in response to inputs from a user.

The coupling interface may include at least one port. The at least one port may be configured to supply power to the external device when the coupling interface is physically connected to a corresponding coupling interface unit of the external device and to receive a signal from the external device in response to the supplied power. In this case, the corresponding coupling interface of the external device may generate the signal in hardware by returning a part of the supplied power.

The controller may include a control path manager. The control path manager may be configured to reconfigure an initial command control path for transferring commands with associated data, which is generated by an application installed in the controller of the user equipment, to at least one of the first constituent elements of the external device when the user equipment is connected to the external device through the corresponding coupling interfaces, reconfigure an initial event control path that receives event signals generated in at least one of the first constituent elements of the external device when the user equipment is connected to the external device through the corresponding coupling interfaces, reconfigure the reconfigured command control path back to the initial command control path for transferring commands with associated data to at least one of the second constituent elements, and reconfigure the reconfigured event control path back to the initial event control path for receiving event signals generated in at least one of the second constituent elements.

The controller may include an agent and a control path manager. The agent may be configure to transfer the command with related data to the external device and to receive the event signals from the external device when the user equipment is connected to the external device. The control path manager may be configured to transfer the command with related data to the agent when the user equipment is connected to the external device, to transfer the command with related data to at least one of the second constituent elements when the user equipment is disconnected from the external device, to receive the event signal from the agent and transfer the received signal to the controller when the user equipment is connected to the external device, and to receive the event signal from at least one of the second constituent elements and transfer the received event signal to the controller.

The controller may be configured to register a first module at the control path manager. The agent may be configured to register a second module at the control path manager. The control path may be configured to call the first module to transfer the command with related data to the controller when the user equipment is disconnected from the external device and to call the second module to transfer the command with related data to the agent.

The controller may be configured to generate the command with associated data, as results of performing associated applications installed in the controller and to transmit the generated command with associated data to at least one of the first constituent elements of the external device through the reconfigured command path. The at least one of the first constituent elements of the external device may be controlled to output the associated data based on the command.

The controller may be configured to receive the event signals from the external device through the reconfigured event control path and to perform an associated application in response to the received event signal. The event signals may be generated in at least one of the first constituent elements of the external device in response to inputs from a user.

The controller may be configured to obtain first constituent element information from the external device and to select target constituent elements to be controlled from the first constituent elements based on the first constituent element information. The first constituent element information may include identification numbers of the first constituent elements and constituent elements having the same identification numbers of the second constituent elements based on the first constituent element information.

The controller may be configured to obtain operating setting of the second constituent elements and to synchronize operating setting of the selected target constituent elements with obtained operating setting of the second constituent elements.

BRIEF DESCRIPTION OF THE DRAWINGS

The above and/or other aspects of the present invention will become apparent and more readily appreciated from the following description of embodiments, taken in conjunction with the accompanying drawings, of which:

FIG. 1B shows an external device in accordance with an embodiment of the present invention;

FIG. 6 shows a constituent element identification table in accordance with embodiments of the present invention;

FIG. 9 shows a method for disconnecting user equipment from an external device in accordance with embodiments of the present invention.

DETAILED DESCRIPTION OF THE INVENTION

Figure 1A:
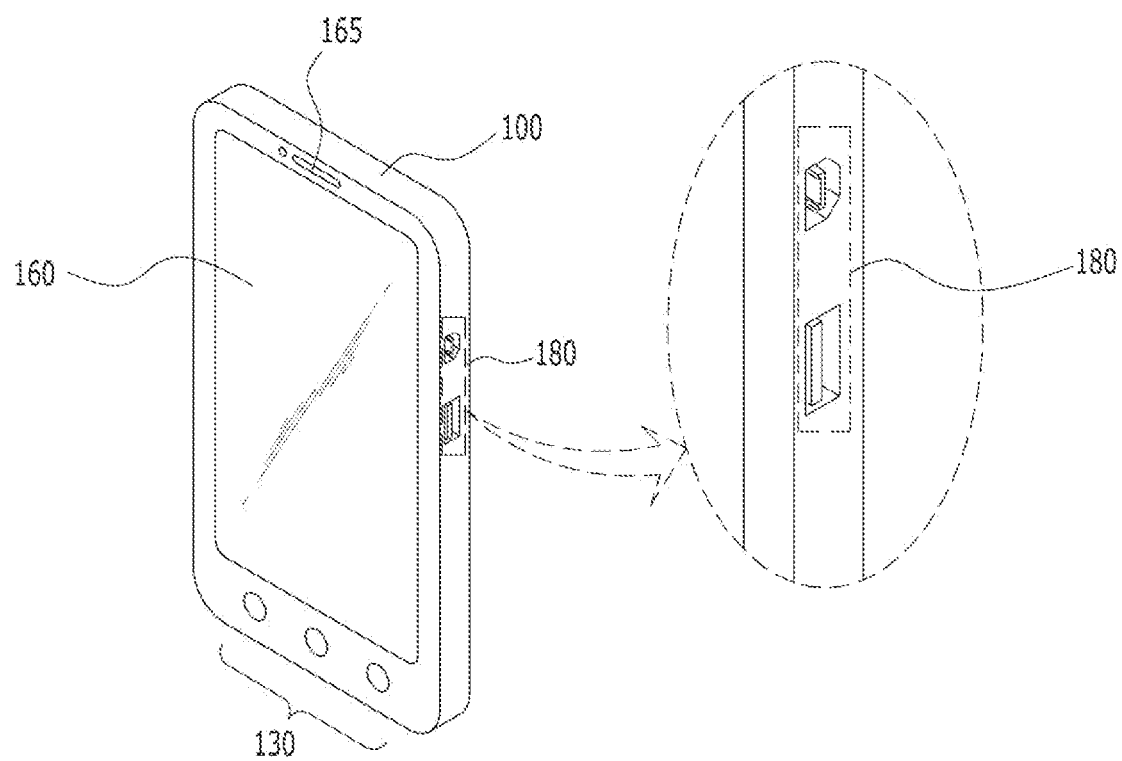
FIG. 1A shows user equipment in accordance with an embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1A shows user equipment 100 in accordance with embodiments of the present invention.

Referring to FIG. 1A, user equipment 100 may include various constituent elements for receiving data, audio, and video information and outputting audio and video information, as a result of processing the received information, in response to various types of user commands. For example, user equipment 100 may include input unit 130, display unit 160, and audio output unit 165. Input unit 130 may receive user commands. Furthermore, display unit 160 may be embodied with a touch screen for receiving user commands. In this case, user equipment 100 may receive user inputs not only through input unit 130 but also through display unit 160. Display unit 160 may also display data according to display setting of user equipment 100. Audio output unit 165 may output audio data in response to the control of controller and/or user inputs. In general, such constituent elements of user equipment 160 may have less performance than corresponding constituent elements of external device 200 (FIG. 1B) due to the limitation in size, but the present invention is not limited thereto. For example, display unit 160 may typically have about 4.5 inch display area which is smaller than that of external device 200. For better performance, user equipment 100 may he coupled to external device 200 having a larger display size and a better speaker performance in accordance with embodiments of the present invention.

In order to connect user equipment 100 to external device 200, user equipment 100 may include coupling interface unit 180. Coupling interface unit 180 may be coupled to corresponding coupling interface unit 280 of external device 200. Coupling interface unit 180 may allow user equipment 100 to exchange data with external device 200. For example, user equipment 100 may be capable of processing video data and transferring the processed video data to external device 200 through coupling interface unit 180. Particularly, user equipment 100 may process image data corresponding to display setting of display unit 160 and display the processed image data on display unit 160. In accordance with an embodiment of the present invention, user equipment 100 may be capable of i) adjusting the processed image data according to display setting of external device 200, ii) transferring the adjusted image data to external device 200 through the coupling interface unit 180, and ii) controlling display unit 260 of external device 200 to display the adjusted image data.

As described above, user equipment 100 may include coupling interface unit 180 in accordance with embodiments of the present invention. Such a coupling interface unit 180 may include a high definition multimedia interface (HDMI) port and/or a universal serial bus (USB) port, but the present invention is not limited thereto. User equipment 100 may have a certain design or standardized interface connectable to external device 200. For example, user equipment 100 may be attachable to and/or detachable from external device 200 with a cable or wireless radio. User equipment 100 may dock to external device 200. User equipment 100 may be any electronic device that can perform the above and further operations described herein. For example, user equipment 100 may include, but is not limited to, include a system, a device, a subscriber unit, a subscriber station, a mobile unit, a mobile terminal, a remote station, a remote terminal, an access terminal, a user terminal, a terminal, a communication device, and a user device. Furthermore, user equipment 100 may include a portable phone, a smart phone, a personal digital assistant (PDA), a mobile phone, a satellite phone, a wireless phone, a session initiation protocol (SIP) phone, a wireless local loop (WLL) station, a handheld device capable of wireless communication, a portable multimedia player (PMP), a navigation, and a processing device coupled to a wireless MODEM. The present invention, however, is not limited thereto, and other types of user equipment, such as minilaptop PCs and other computing devices may incorporate embodiments of the present invention. User equipment 100 will be described in more detail with reference to FIG. 4.

FIG. 1B shows an external device in accordance with embodiments of the present invention.

Referring to FIG. 1B, external device 200 may also include various constituent elements for receiving data, audio, and video information and outputting the received information, as a result of processing the received information, in response to various types of user inputs. For example, external device 200 may include input unit 230, display unit 260, and audio output unit 265, which are corresponding to input unit 130, display unit 160, and audio output unit 165. As compared to input unit 130, display unit 160, and audio output unit 165 in user equipment 100, input unit 230, display unit 260, and audio output unit 265 in external device 200 may perform similar or identical operations in response to the same user commands and/or generate identical events in response to the same user input. The events may be an event signal generated in response to a user input.

Input unit 230 may receive inputs from a user. Furthermore, display unit 260 may be embodied with a touch screen for receiving user inputs. Display unit 260 may display data according to display setting of external device 200. Audio output unit 265 may output audio data. In general, such constituent elements of external device 200 may have better performance than corresponding constituent elements of user equipment 100 due to the limitation in size, but the present invention is not limited thereto. For better performance, external device 200 may be coupled to user equipment 100 having a smaller display size and less speaker performance in accordance with embodiments of the present invention. For example, display unit 260 may have a larger display area, such as about 10.1 inch of display area.

In order to be connected to user equipment 100, external device 200 may include coupling interface unit 280. Coupling interface unit 280 may be coupled to a corresponding coupling interface unit 180 of user equipment 100. Coupling interface unit 280 may allow external device 200 to exchange data with user equipment 100. Particularly, external device 200 may receive control data from user equipment 100 through coupling interface unit 280 and constituent elements of external device 200 may be controlled based on the received control data. For example, external device 200 may receive processed video data from user equipment 100 through coupling interface unit 280 and display unit 260 may be controlled and output the received video data in response to the control of user equipment 100.

Coupling interface unit 280 may include a HDMI port and/or a USB port corresponding to coupling interface unit 180 of user equipment 100. External device 200 may have a certain design connectable to user equipment 100 through at coupling interface unit 280. For example, external device 200 may be attachable to and/or detachable from user equipment 100 as described above with respect to FIG. 1A. External device 200 may have a structure for receiving and holding user equipment 100. Such a structure may be referred to as coupling bay 251. External device 200 may be any electronic device that can perform the above operation. For example, external device 200 may include a notebook computer, a laptop computer, a tablet PC, a pad having a touch screen, and a pad having a display unit and a keyboard, but the present invention is not limited thereto. In accordance with an embodiment of the present invention, external device 200 may be activated when user equipment 100 is connected to external device 200 and controlled by user equipment 100. Accordingly, external device 200 may have at least constituent elements for necessary operation performed under the control of user equipment 100.

As described above, user equipment 100 may be coupled to external device 200. For example, coupling interface unit 180 of user equipment 100 may be coupled to coupling interface unit 280 of external device 200. In accordance with embodiments of the present invention, user equipment 100 may be coupled to external device 200 in a docking manner. Such coupling manner will be described with reference to FIG. 2.

Figure 2:
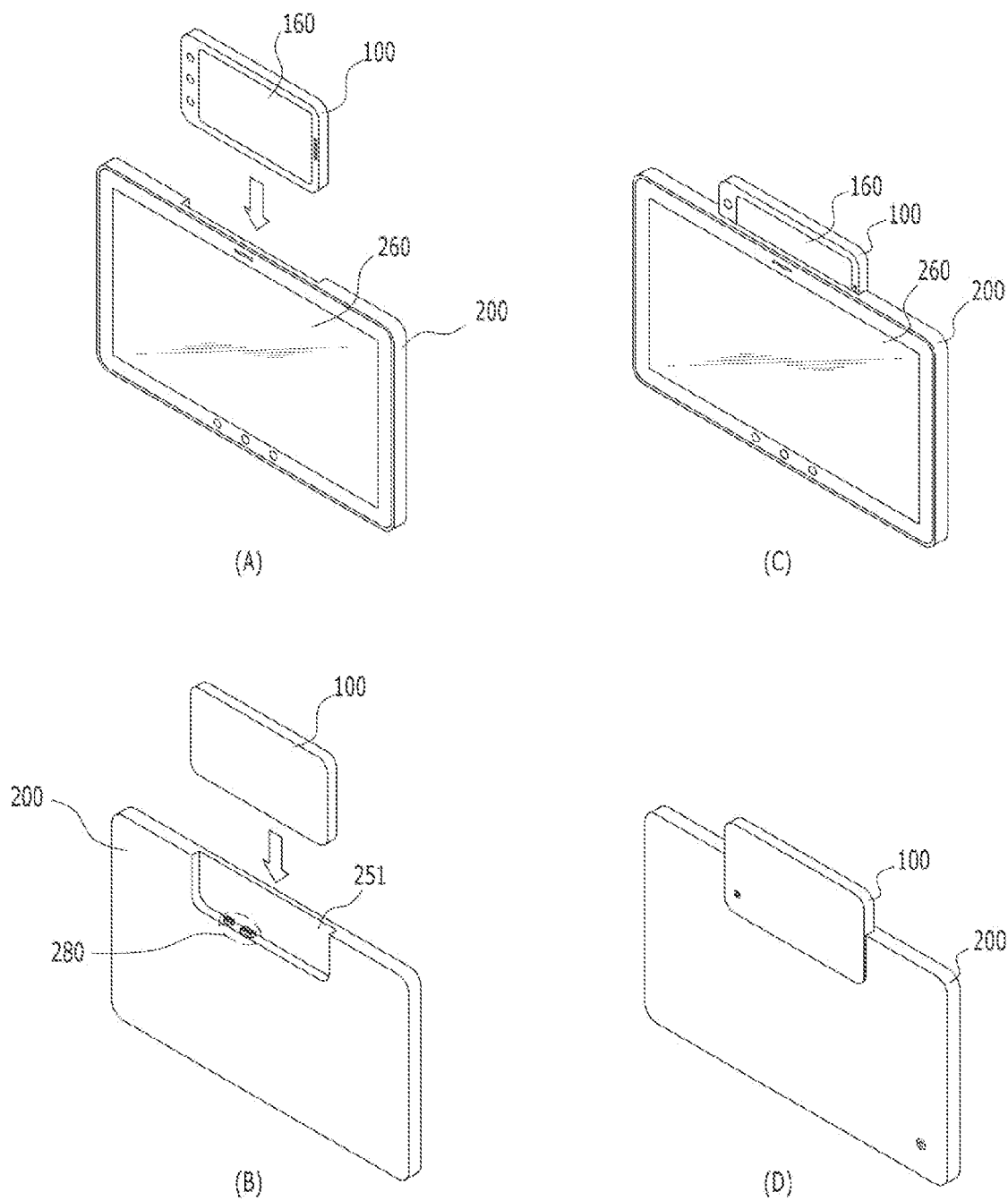
FIG. 2 shows user equipment coupled to an external device in accordance with an embodiment of the present invention.

FIG. 2 shows user equipment coupled to an external device in accordance with embodiments of the present invention.

Referring to FIG. 2, user equipment 100 may be inserted in coupling bay 251 of external device 200 in a top-to-bottom direction as shown in a diagram (A). As shown in diagram (B), display unit 160 of user equipment 100 and display unit 260 of external device 200 may face the same direction while user equipment 100 is inserted into coupling bay 251 of external device 200. As shown in diagram (C), user equipment 100 may be completely inserted into coupling bay 251 of external device 200 until coupling interface unit 180 of user equipment 100 is interlocked to coupling interface unit 280 of external device 200. Although FIG. 2 shows that user equipment 100 is coupled with external device 200 in a docking manner, the present invention is not limited thereto. User equipment 100 may be coupled to external device 200 in other manners.

Figure 3:
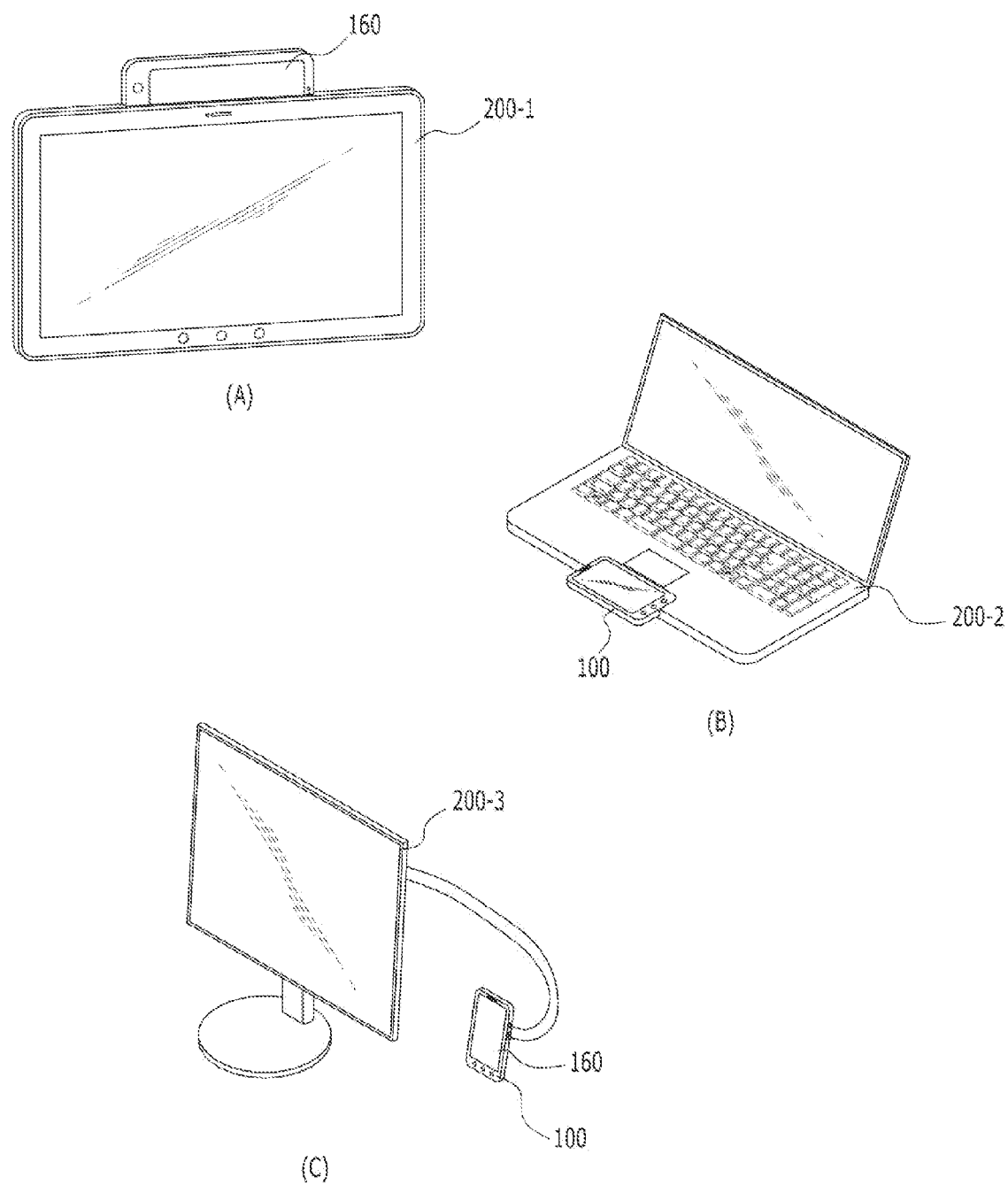
FIG. 3 shows various manner of connecting user equipment and an external device.

FIG. 3 shows various coupling manners of user equipment and an external device.

Referring to FIG. 3, user equipment 100 may be coupled to a pad type device 200-1 in a docking manner as show in a diagram (A). Furthermore, user equipment 100 may be coupled to a laptop computer 200-2 in a docking manner as show in a diagram (B). User equipment 100 may be coupled to a monitor 200-3 through a physical cable as shown in a diagram (C).

As shown, user equipment 100 may be coupled to external device 200 in various manners. After user equipment 100 is coupled to external device 200, user equipment 100 may exchange data with external device 200 through coupling interface units 180 and 280. In accordance with embodiments of the present invention, user equipment 100 may control external device 200 by exchanging data through a communication link formed between coupling interface unit 180 of user equipment 100 and coupling interface unit 280 of external device 200. Particularly, user equipment 100 may adjust image data according to a display setting of display unit 260 of external device 200, transfer the adjusted image data to external device 200 through coupling interface units 180 and 280, and control display unit 260 of external device 200 to display the adjusted image data in accordance with embodiments of the present invention.

Hereinafter, user equipment 100 will be described in more detail with reference to FIG. 4. As described above, user equipment 100 may be coupled to external device 200 and control external device 200 in accordance with embodiments of the present invention. Particularly, user equipment 100 may control constituent elements of external device 200 after user equipment 100 is connected to external device. In order to control, user equipment 100 may change a control path for controlling constituent elements of external device 200.

Figure 4:
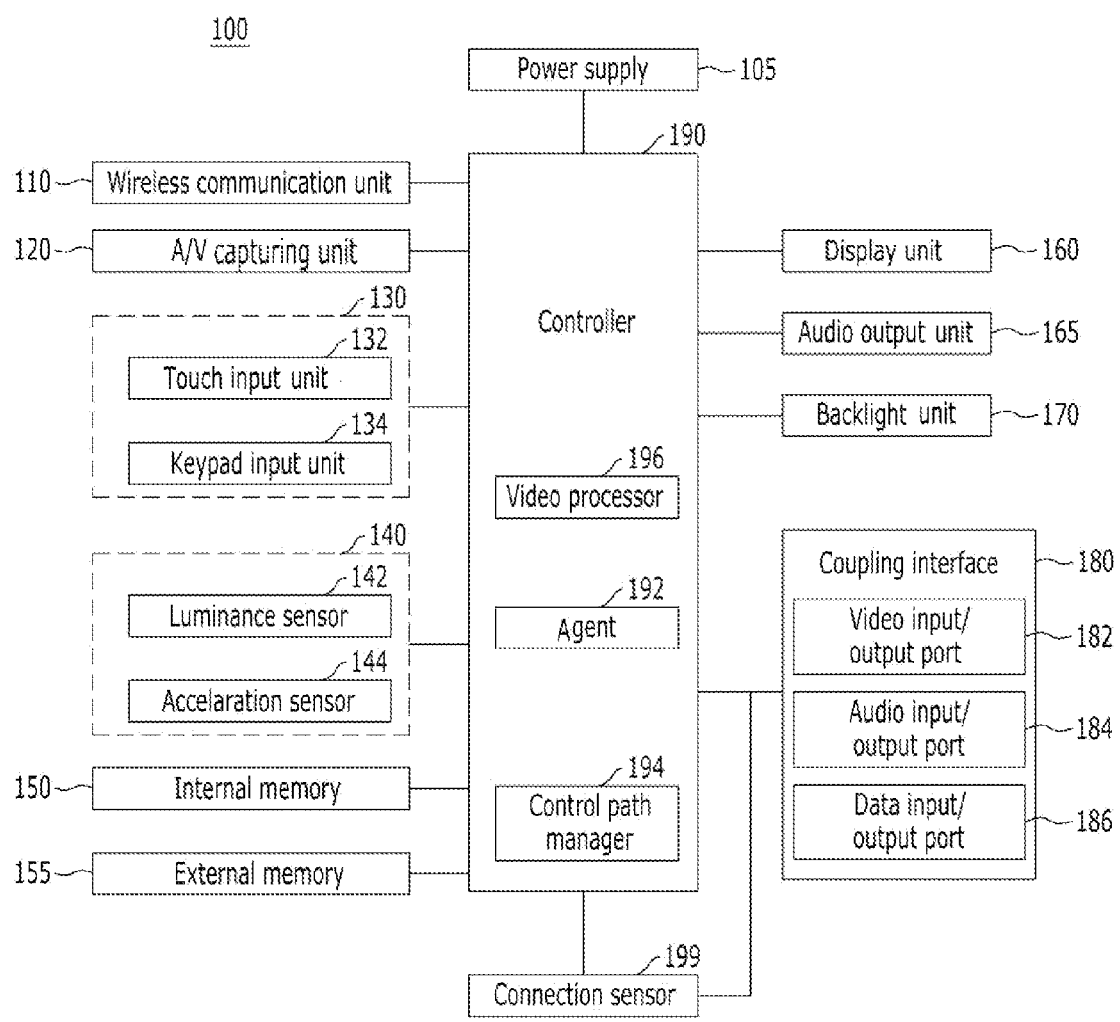
FIG. 4 shows user equipment in accordance with an embodiment of the present invention.

FIG. 4 shows an exemplary embodiment of user equipment in accordance with an embodiment of the present invention.

Referring to FIG. 4, user equipment 100 may include wireless communication unit 110, audio/video (A/V) capturing unit 120, input unit 130, sensing unit 140, internal memory 150, external memory 155, display unit 160, audio output unit 165, backlight unit 170, coupling interface 180, controller 190, connection sensor 199, and power supply 105. Controller 190 may include agent 192, control path manager 194, and video processor 196. Coupling interface 180 may include video input/output port 182, audio input/output port 184, and data input/output port 186. Power supply 105 may include a battery for electric charging. User equipment 100 may be described as including the above constituent elements, but the present invention is not limited thereto.

Wireless communication unit 110 may perform wireless communication with other party. Particularly, wireless communication unit 110 may include at least one module for communicating with other party through a wireless communication system. For example, wireless communication unit 110 may include any or all of a broadcasting signal receiving module, a mobile communication module, a wireless Internet module, a short-distance communication module, and a location information module.

In accordance with an embodiment of the present invention, wireless communication unit 110 may be not an essential unit for user equipment 100 because user equipment 100 may be not required to communicate with another party. Accordingly, wireless communication unit 110 may be omitted in accordance with another embodiment of the present invention.

A/V capturing unit 120 may capture an audio signal and/or a video signal For example, the A/V capturing unit 120 may include a camera and a microphone. The camera may process a still image or image frames of a moving image, which are captured by an image sensor in a video call mode or a photographing mode. The microphone may receive an audio signal provided externally in an on-call mode, a recording mode, a voice recognition mode.

Input unit 130 may be a user interface for receiving input from a user. Such an input unit 130 may be realized in various types. For example, input unit 130 may include any of a keypad, a dome switch, a touch pad, a jog wheel, and a jog switch, but is not limited thereto. Consequently, input unit 130 is shown having touch input unit 132 for receiving touch screen input data and the like, and keypad input unit 134 for receiving keypad data and the like.

Sensing unit 140 may detect a current status of user equipment 100. For example, sensing unit 140 may sense an opening or closing of a cover of user equipment 100, a location of user equipment 100, acceleration and deceleration of user equipment 100, or physical contact with or proximity to a user. Based on the detected status of user equipment 100, sensing unit 140 may generate a sensing signal to control the operation of user equipment 100. For example, in the case of a mobile phone having a sliding type cover, sensing unit 140 may sense whether a cover is opened or closed. Sensing unit 140 may sense whether or not power supply 105 supplies power.

Video processor 196 may process a video signal and/or video data under the control of controller 190. Particularly, video processor 196 may process video data according to a display setting determined based on display unit information of display unit 160. The display setting may include a screen size, a screen resolution, a display direction, and a dot per inch (DPI) value. The display setting may be determined by controller 190 based on display unit information of display unit 160. The display unit information may include a manufacturer, a model number, a device identifier (ID), a DPI value, a screen size, the number of pixels, supporting screen resolutions, supporting aspect ratios, refresh rates, and a response time. Video processor 196 may transmit the processed image data to display unit 160 of user equipment 100 in response to controller 190. Furthermore, video processor 196 may process image data to be transmitted to external device 200 when user equipment 100 is connected to external device 200. For example, video processor 196 may reconfigure image data based on a display setting of external device 200 and generate a signal based on the reconfigured image data in response to controller 190. The present invention, however, is not limited thereto. Such an operation of reconfiguring image data may be performed by controller 190. The image data may be data for displaying a graphic user interface produced by any software programs installed in user equipment 100, such as an operating system and applications installed in user equipment 100.

Internal memory 150 and external memory 155 may be used as a data storage device of user equipment 100. For example, internal memory 150 and external memory 155 may store information necessary for operating user equipment 100 and performing certain operations requested by a user. Such information may include any software programs and related data. For example, internal memory 150 and external memory 155 may store an operation system data, applications, and related data, received from an external device through a physical cable and downloaded from a related server from through a communication link. In accordance with an embodiment of the present invention, internal memory 150 and/or external memory 155 may store information on display setting determined for display unit 160 or display unit 260 of external device 200. Furthermore, internal memory 150 and external memory 155 may store device unit information for candidate external devices connectable to user equipment 100. Internal memory 150 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, but is not limited thereto. External memory 155 may be a SD card or a USB memory, but the present invention is not limited thereto. For example, external device 200 may function as external memory 155 when external device 200 is coupled to user equipment 100 in accordance with an embodiment of the present invention.

Display unit 160 may be an output device for visually displaying information. For example, display unit 160 may display image data produced or processed by video processing unit 196 and/or controller 190. Display unit 160 may receive the image data from at least one of video processing unit 196 and controller 190 and display the received image data. The image data may be produced as a result of certain operations performed by any software programs installed in user equipment 100. For example, the image data may be data processed for displaying a graphic user interface produced by an operation system and applications, performed in user equipment 100. The applications may be referred to as "Apps". Also, the image data may further include still images and moving images, produced or processed by video processing unit 196 and controller 190. For example, display unit 160 may be a liquid crystal display (LCD) panel or an active-matrix organic light-emitting diode (AMOLED) panel, but the present invention is not limited thereto.

In accordance with an embodiment of the present invention, display unit 160 may be interrupted to display the image data when user equipment 100 is connected to external device 200. For example, display unit 160 may be turned off or transit to a sleep mode in response to controller 190 when user equipment 100 is connected to external device 200. Display unit 160 may be turned on again or transit back to an operation mode in response to controller 190 when user equipment 100 is disconnected from external device 200.

Audio output unit 165 may provide and output audio signal that may be produced or processed by controller 190 as a result of operations performed by an operating system and/or applications installed in user equipment 100. Audio output unit 165 may include a speaker, a receiver, and a buzzer.

Backlight unit 170 may be a light emitting device disposed under display unit 160. Backlight unit 170 may improve readability of display unit 160. Backlight unit 170 may be a cold cathode fluorescent lamp (CCFL), an external electrode fluorescent lamp (EEFL), a light emitting diode (LED), and a flat fluorescent lamp (FFL).

Coupling interface 180 may be coupled to corresponding coupling interface 280 of external device 200 when user equipment 100 is placed in coupling bay 215. As described above, coupling interface 180 may allow user equipment 100 to exchange data with external device 200. Coupling interface 180 may include at least one port for exchanging signals and/or data with external device 200. In accordance with an embodiment of the present invention, coupling interface 180 may transfer video data and audio data from user equipment 100 to external device 200. Coupling interface 180 may exchange control data with external device 200.

Coupling interface 180 may be coupled to corresponding coupling interface 280 of external device 200 in various ways. For example, coupling interface 180 may be coupled to corresponding coupling interface 280 of external device 200 through a physical cable. Furthermore, coupling interface 180 may be directly interlocked with corresponding coupling interface 280 of external device 200. The present invention, however, is not limited thereto. Coupling interface 180 may be coupled to corresponding coupling interface 280 of external device 200 through a radio link formed between user equipment 100 and external device 200. In this case, coupling interface 180 and coupling interface 280 may each include a wireless signal transmitter and receiver ("transceiver", not shown in the FIGS.) for communicating with each other using a predetermined communication protocol. Such communication protocol may be Bluetooth® or WiFi, for example, but the present invention is not limited thereto.

As shown in FIG. 4, coupling interface 180 may include video input/output port 182, audio input/output port 184, and data input/output port 186, but the present invention is not limited thereto. Such coupling interface 180 may be embodied in various types. For example, coupling interface 180 might omit audio input/output interface 184. Further, coupling interface unit 180 may further include a power port (not shown in the FIGs.). In this case, the power port may transfer power from external device 200 to user equipment 100 when external device 200 is coupled to user equipment 100.

Coupling interface 180 is described subsequently with reference to FIG. 7. Coupling interface 180 may be an interface for inputting and outputting audio and video signals and control signals. By example, referring to FIG. 7, coupling interface 180 may include high definition multimedia interface (HDMI) port 710, universal serial bus (USB) port 720, and audio port 730. For example, video input/output port 182 may be HDMI port 710, audio input/output port 184 may be audio port 730, and data input/output pot 176 may be USB port 720. The present invention, however, is not limited thereto. In other embodiments of the present invention, coupling interface unit 180 may include other types of connectors and ports.

Such HDMI port 710 and/or USB port 720 may enable user equipment 100 to be connected to various types of typical electronic devices such as a television set, a monitor, or audio devices, which have a HDMI port and/or a USB port. Accordingly, video and/or audio data processed in user equipment 100 may be output through the television set, the monitor, or audio devices although such general electronic devices do not have configuration like external device 200.

Returning to FIG. 4, connection sensor 199 may sense connection to external device 200 when user equipment 100 is coupled to external device 200 in accordance with embodiments of the present invention. For example, when user equipment 100 is physically coupled to external device 200, user equipment 100 may transmit a first signal to external device 200. Upon the receipt of the first signal, external device 200 may indicate that user equipment 100 is connected thereto. Particularly, when coupling interface unit 180 includes HDMI port, the first signal may be transferred through HDMI 5V power pin of HDMI port. In this case, the first signal may be power supplied from user equipment 100 to external device 200. User equipment 100 may be configured to supply power through the HDMI 5V power pin while user equipment 100 is powered on. Accordingly, when user equipment 100 is coupled to external device 200 through coupling interface unit 180, power may be transmitted as the first signal to external device 200 through the HDMI 5V power pin of HDMI port. When user equipment 100 is disconnected from external device 200, power may be not supplied to external device. Accordingly, external device 200 may indicate that user equipment 100 is disconnected from external device 200 when power is not supplied through HDMI 5V power pin of HDMI port.

In response to the first signal, external device 200 may transmit a second signal to user equipment 100. For example, connection sensor 199 may sense the receipt of the second signal. Upon the receipt of the second signal, user equipment 100 may indicate that user equipment 100 is successfully connected to external device 200. For example, when coupling interface unit 180 includes HDMI port, the second signal may be transferred through a HDMI hot plug detect (HPD) pin of HDMI port.

As described above, user equipment 100 may be connected to external device 200 through a radio link formed between user equipment 100 and external device 200 instead of physical connection. In this case, user equipment 100 and external device 200 may include a radio connection interface (not shown). Such a radio connection interface may be realized using a WIFE. technology or Bluetooth® technology. Furthermore, user equipment 100 and external device 200 may include a wireless HDMI interface or a wireless USB interface. In this case, connection sensor 199 may determine whether a wireless connection is established between user equipment 100 and external device 200.

Controller 190 may control overall operation of the constituent elements of user equipment 100, Particularly, controller 190 may perform operations necessary for driving the constituent elements of user equipment 100 in response to inputs received from a related user. In accordance with embodiments of the present invention, controller 190 may control overall operation of constituent elements of external device 200 when user equipment 100 is connected to external device 200. For example, when user equipment 100 is connected to external device 200, controller 190 may receive inputs from a user through external device 200, perform an operation in response to the received inputs, and provide the user with the result thereof through external device 200. Particularly, controller 190 may control display unit 160 of user equipment 100 in order to display image data on display unit 160 of user equipment 100 before user equipment 100 is connected to external device 200. When user equipment 100 is connected to external device 200, controller 190 may i) inactivate or otherwise modify the projected output of display unit 160 of user equipment 100, synchronize an operation state of display unit 160 with display unit 260 of external device 200, iii) transmit processed video data to external device, and iv) control display unit 260 of external device 200 to display the processed video data.

As described above, controller 190 may control constituent elements of external device 200, associated with the same type of constituent elements of user equipment 100 when user equipment 100 is connected to external device 200. The same type of constituent elements of user equipment 100 and external device 200 may be constituent element having the same identification number. For example, when user equipment 100 is connected to external device 200, controller 190 may control input unit 230, sensor unit 240, display unit 260, and audio output unit 265 of external device 200 instead of input unit 130, sensor unit 140, display unit 160, and audio output unit 165 of user equipment 100.

In order to control the constituent elements of external device 200 instead of corresponding constituent elements of user equipment 100, user equipment 100 may change a control path including a command control path and/or an event control path. The control path may be a path for transferring data between controller 190 and related constituent elements. The data may denote data generally required for controlling constituent elements and outputting operation results through constituent elements. Particularly, the control path may include a command control path and an event control path. The command control path may be a path for transferring commands from controller 190 to a related constituent element when controller 190 generates the commands. The event control path may he a path for transferring events from a constituent element to controller 190 when the constituent element generates the events. That is, when user equipment 100 is connected to external device 200, controller 190 may transfer commands generated in user equipment 100 to constituent elements of external device 200 by changing a command control path to transfer the generated commands to the constituent elements of external device 200. When user equipment 100 is disconnected from external device 200, controller 190 may transfer commands back to constituent elements of user equipment 100 by restoring the initial command control path to transfer the generated data to the constituent elements of user equipment 100. Furthermore, when user equipment 100 is connected to external device 200, controller 190 may process events received from constituent elements of external device 200 by changing an event control path to receive the generated event from the constituent elements of external device 200. When user equipment 100 is disconnected from external device 200, controller 190 may process events received from constituent elements of user equipment 100 by restoring an initial event control path to receive the generated event from constituent elements of user equipment 100.

For example, a command may be generated for turning on/off constituent elements such as display units 160 and 260. In response such command, display units 160 and 260 may be turned on/off. A command may be for reading state values of constituent elements such as sensor units 140 and 240. In response such command, sensor units 140 and 240 may return a sensing result value to controllers 190 and 290. A command may be for setting properties of constituent elements such as backlight units 170 and 270. In response such command, backlight units 170 and 270 may perform related operation with the set properties. Such commands may be referred to as control data.

In accordance with embodiments of the present invention, controller 190 may include agent 192 and control path manager 194. Agent 192 may control operations related to connection to external device 200 and controlling external device 200. Such agent 182 may be referred to as a coupling agent or a docking agent, but the present invention is not limited thereto. Agent 182 may be implemented in software. For example, agent 182 may be realized on an application layer in an operating system (OS) structure of user equipment 100. For example, such an OS structure may be an OS structure of an Android operating system, but present invention is not limited thereto. Furthermore, agent 192 may receive data generated in controller 190 from control path manager 194 and transfer data generated in controller 190 to external device 200 through coupling interface unit 180 when user equipment 100 is connected to external device 200.

Control path manager 194 may control a control path according to whether user equipment 100 is connected to external device 200 or not. Particularly, control path manager 194 may change a control path to transfer data generated in user equipment 100, such as control data or commands, to external device 200 when user equipment is connected to external device 200. In this case, control path manager 194 may transfer the generated data to agent 192. Agent 192 may receive the generated data from control path manager 194 and transfer the received data to related constituent elements of external device 200. Control path manager 194 may change a control path to receive data generated in external device 200, such as events, to user equipment when user equipment 100 is connected to external device. In this case, agent 192 may receive the generated data from external device 200 and transfer the received data to control path manager 194. The control path manager 194 may transfer the received data to controller 190.

When user equipment 100 is disconnected from external device 200, control path manager 194 may receive data from controller 192 and transfer the received data directly to constituent elements of user equipment 100. Furthermore, control path manager 194 may receive data directly from constituent elements of user equipment 100 and transfer the received data to controller 192.

As described above, user equipment 100 may be connected to external device 200 and control constituent elements of external device 200. External device 200 may perform operation under the control of user equipment 100 after it is connected to user equipment 100, For example, external device 200 may be a dummy terminal before connected to user equipment 100. When user equipment 100 is connected to external device 200, external device 200 may be activated and perform operations based on control data received from user equipment 100. Hereinafter, external device 200 will be described with reference to FIG. 5.

Figure 5:
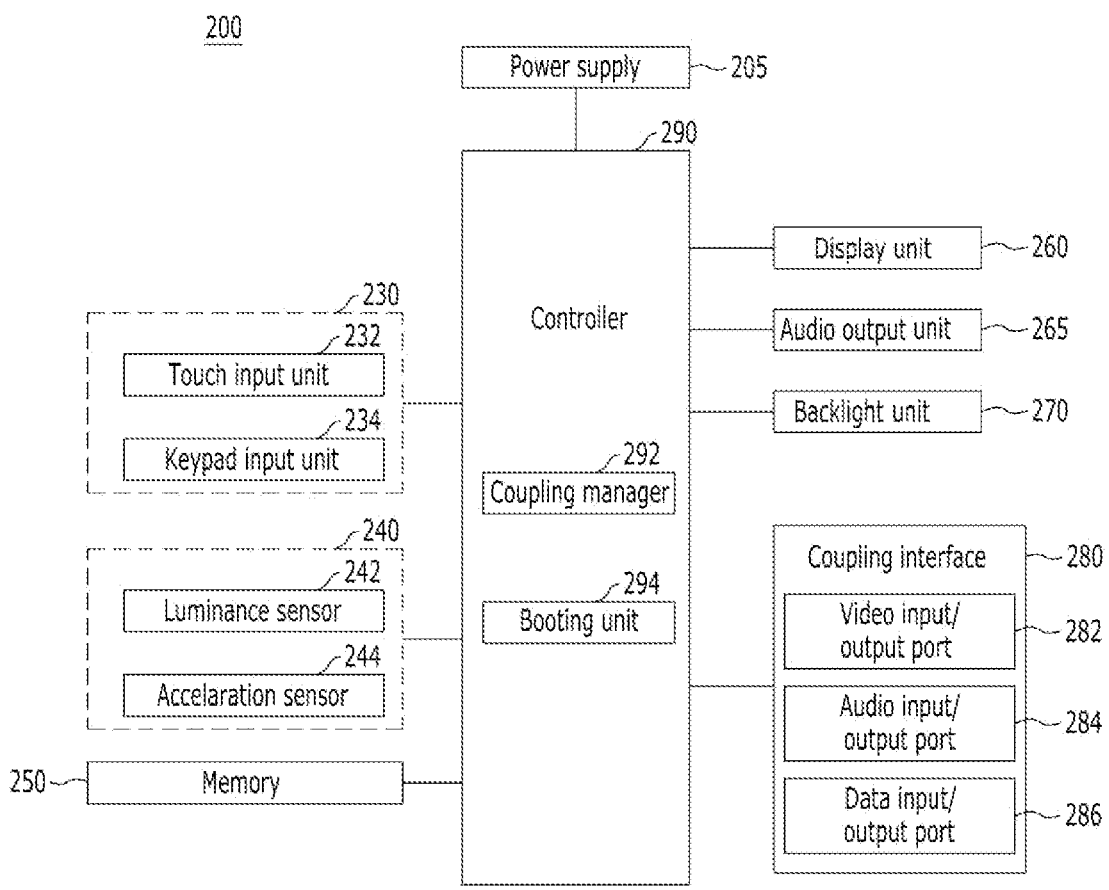
FIG. 5 is a block diagram illustrating external device in accordance with an embodiment of the present invention.

FIG. 5 shows an external device in accordance with an embodiment of the present invention.

Referring to FIG. 5, external device 200 may include power supply 205, input unit 230, sensor unit 240, memory 250, display unit 260, audio output unit 265, backlight unit 270, coupling interface unit 280, and controller 290. User input unit 230 may include touch input unit 232 and keypad input unit 234. Sensor unit 240 may include an illuminance sensor 242 and an acceleration sensor 244. Controller 290 may include manager 292 and booting unit 294. Coupling interface unit 280 may include a video input/output port 282, audio input/output unit 284, and data input/output unit 286. As shown, external device 200 may include similar or identical types of constituent elements compared to constituent elements of user equipment 100. Such constituent elements of external device 200 may be analogous to, and perform similar and/or identical functions to corresponding constituent elements of user equipment 100 in accordance with embodiments of the present invention. Corresponding constituent elements of user equipment 100 and external device 200 may be the same type of constituent elements and have the same identification number. For example, display unit 260, audio output unit 265, touch input unit 232, key pad input unit 234, memory unit 250, and power supply unit 205 may be analogues to and perform similar functions to display unit 160, audio output unit 165, input unit 130, internal memory unit 150, and power supply unit 105 of user equipment 100.

In accordance with embodiments of the present invention, the same types of constituent elements of external device 200 and user equipment 100 may perform similar or identical operations in response to the same types of commands and generate similar or identical events for the same type of inputs from a user. The events may be generated in response to inputs made by a user. For example, backlight units 170 and 270 of user equipment 100 and external device 200 may emit light in response to the same command, such as a turn-on command, and may interrupt emitting light in response to the same command, such as a turn-off command. Illumination sensors 142 and 242 of user equipment 100 and external device 200 may perform a sensing operation and generate a sensing result value in response to the same command such as a sensing-on command. Furthermore, acceleration sensor 144, touch input unit 132, keypad input unit 134, external memory 155, display unit 160, audio output unit 265 of external device 200 may perform similar or identical operations compared to acceleration sensor 244, touch input unit 232, keypad input unit 234, memory unit 250, video output unit 260, and audio output unit 265 of external device.

In order to determine corresponding constituent elements of user equipment 100 and external device 200, user equipment 100 and external device 200 may store and manage constituent element identification information. The constituent element identification information may contain identification numbers of constituent elements of user equipment 100 and external device 200. Such constituent element identification information may be stored in a form of a table. The constituent element identification information may be determined and stored in user equipment 100 and external device 200 by a manufacturer, but the present invention is not limited thereto. Furthermore, the constituent element identification information may be provided from a related server through a communication network. The constituent element identification information may be updated regularly, but the present invention is not limited thereto. Such a constituent element identification table will be described subsequently with reference to FIG.

External device 200 may not include all constituent elements that user equipment 100 includes. For example, external device 200 may not include a wireless communication unit, a camera, and a keypad input unit that user equipment 100 includes. In this case, user equipment 100 may still use constituent elements that external device 200 excludes when user equipment 100 is connected to external device 200.

Since the same type of constituent elements of user equipment 100 and external device 200 perform similar and/or identical operations, detailed descriptions of constituent elements performing the same operations will be omitted. Referring to FIG. 5, coupling interface unit 280 and controller 290 of external device 200 will be described hereinafter.

Coupling interface 280 may be connected to coupling interface 180 of user equipment 100. That is, coupling interface 280 may be a connecting port for forming connectivity between user equipment 100 and external device 200. Accordingly, coupling interface unit 280 may form a pairwise relation with coupling interface 180 of user equipment 100. Coupling interface 280 may have substantially similar or identical interface configuration of that of coupling interface 180 of user equipment 100. For example, coupling interface 280 may have a HDMI port, a USB port, and an audio port.

Particularly, coupling interface 280 may include video input/output port 282, audio input/output port 284, and data input/output port 286. Video input/output port 282 may receive video data from user equipment 100. Audio input/output port 284 may receive audio signals. Data input/output port 286 may exchange data with user equipment 100. Furthermore, coupling interface unit 280 may include a power port (not shown) for transferring power to user equipment 100 and a sensing port (not shown) for sensing connection formed between user equipment 100 and external device 200. Such a power port and a sensing port may be included in one of video input/output port 282, audio input/output port 284, and data input/output port 286. The present invention, however, is not limited thereto. For example, the power port and the sensing port may each be provided as an independent port. Furthermore, coupling interface unit 280 may be connected to user equipment 100 through a radio link formed between user equipment 100 and external device 200. In this case, coupling interface unit 280 may include a wireless signal transmitter and receiver ("transceiver" not shown in FIGS.) for communicating with each other using a communication protocol. Such communication protocol may be Bluetooth® or WiFi, for example, but the present invention is not limited thereto.

Referring to FIG. 2, external device 200 may include coupling bay 251 in accordance with an embodiment of the present invention. Coupling interface 280 may be disposed on one side of coupling bay 251. Coupling bay 251 may be formed at a part of a rear side of external device 200. Coupling bay 215 may have a space for housing user equipment 100. User equipment 100 may be inserted into coupling bay 215. In accordance with an embodiment of the present invention, coupling interface 180 of user equipment 100 may be connected with coupling interface unit 280 of user equipment 200 when user equipment 100 is completely inserted into coupling bay 251. The present invention is not limited thereto. Such coupling bay 251 may be formed at any sides of external device 200.

Controller 290 may control operation of external device 200 in overall. Particularly, controller 290 may control constituent elements of external device 200 according to whether the connection is established to user equipment 100 or not. In order to control, controller 290 may include manager 292.

Coupling manager 292 may manage and control operations of constituent elements of external device 200 in response to user equipment 100 when external device 200 is coupled to user equipment 100. In accordance with an embodiment of the present invention, manager 292 may receive control data from user equipment 100 through coupling interface 280 and perform operation in response to the control data. Furthermore, manager 292 may receive inputs from a related user and transmit the received input to user equipment 100 through coupling interface 280.

Manager 292 may set up a host-device connection with user equipment 100 when user equipment 100 is connected to external device 200. Accordingly, external device 200 may provide an operation environment identical to that of user equipment 100 when user equipment 100 is connected to external device 200. The operation environment may be a video and audio processing environment and a data input/output environment. That is, a graphic user interface displayed on display unit 160 of user equipment 100 is transferred to and displayed on display unit 260 of external device 200 when user equipment 100 is connected to external device 200. in order to perform such operation, manager 292 may activate display unit 260 of external device 200 when connection to user equipment 100 is initially detected. Then, video data may be received from user equipment 100 and the received video data may be output through display unit 260 of external device 200. Manager 292 may transmit information on constituent elements of external device 200 to agent 192 of user equipment 100 or receive information on constituent elements of user equipment 100 from agent 192 of user equipment 100. Such information may be exchanged through various types of messages.

When user equipment 100 is connected to external device 200, external device 200 may receive input through input unit 230 of external device 200 and generate events accordingly. Such inputs may include touch inputs. In this case, manager 292 may generate an event signal in response to the received inputs and transmit the generated event signal to user equipment 100.

Furthermore, controller 290 may include booting unit 294. Booting unit 294 may power on external device 200 if external device 200 is turned off when connection to user equipment 100 is initially sensed. Accordingly, external device 200 may be activated.

As described above, user equipment 100 and external device 200 may determine the same type of constituent elements based on the constituent element identification table.

The constituent element identification table may include information on identification numbers of constituent elements of user equipment 100 and external devices. Such a constituent element identification table will be described with reference to FIG. 6.

FIG. 6 shows a constituent element identification table in accordance with embodiments of the present invention.

Referring to FIG. 6, user equipment 100 may include constituent element identification table 6010 and external device 200 may include constituent element identification table 6020 in accordance with embodiment of the present invention. As shown in FIG. 6, when constituent elements of user equipment 100 and external device 200 have the same identification numbers, such constituent elements are the same type of constituent elements. That is, when constituent elements having the same identification number, such constituent elements may perform similar or identical operations in response to the same command and/or the same event generated in response to a user input. For example, microphones of user equipment 100 and external device 200 may have the same identification number of 2. Furthermore, acceleration sensors of user equipment 100 and external device 200 may have the same identification number of 5. Similarly, luminance sensors, touch screens, audio output units, backlight units and internal memory units of user equipment 100 and external device 200 may have the same identification numbers of 4, 7, 9, 10, and 11. These constituent elements may perform about the identical operation in response to the same events.

Such constituent element identification tables 6010 and 6020 may be exchanged between user equipment 100 and external device 200 when user equipment 100 is connected to external device 200. Accordingly, user equipment 100 and external device 200 may determine corresponding constituent elements of connected device based on constituent element identification tables 6010 and/or 6020.

As described above, external device 200 may be connected to user equipment 100 and perform operations under the control of user equipment 100 in accordance with an embodiment of the present invention. Such operation may be performed by exchanging data through coupling interfaces 180 and 280. Such coupling interfaces 180 and 280 may be illustrated in FIG. 7. For convenience and ease of understanding, coupling interface 180 is representatively shown in FIG. 7. Coupling interface 280 of external device 200 may have the same configuration of coupling interface 180 of user equipment 100.

Figure 7:
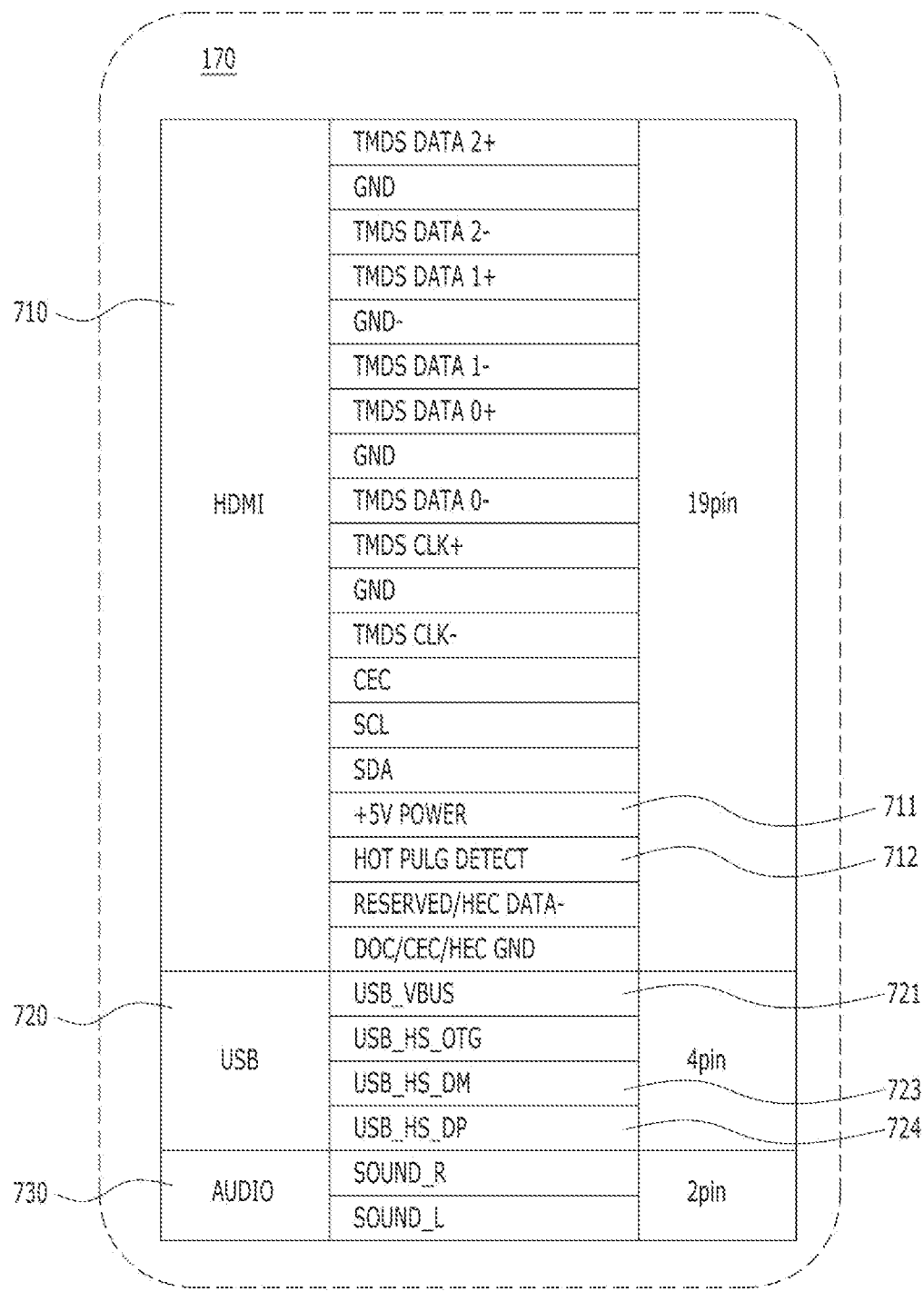
FIG. 7 shows a coupling interface unit of user equipment in accordance with embodiments of the present invention.

FIG. 7 shows a coupling interface unit of user equipment in accordance with embodiments of the present invention.

Referring to FIG. 7, coupling interface 180 of user equipment 100 may include HDMI port 710, USB port 720, and audio port 730. HDMI port 710 may include 19 pins for exchanging signals designated to each pin. For example, HDMI port 710 may include 5V power pin 711 and hot plug detect (HPD) pin 712. 5V power pin 711 may supply power to external device 200 when user equipment 100 is connected to external device 200. Such power may be supplied as a first signal in order to enable external device 200 to detect physical connection to user equipment 100. As described above, external device 200 may have the same HDMI port 710 in accordance with embodiments of the present invention. Particularly, HDMI port 701 of external device 200 may include HPD pin 712. HPD pin 712 may be configured, in hardware manner, to transmit a second signal to user equipment 100 in response to the first signal. For example, when power is supplied from user equipment 100 as the first signal, HPD pin may be configured to return a part of the supplied power, as the second signal, back to user equipment 100. In response to the second signal, user equipment 100 may determine that user equipment 100 is successfully connected to external device 200. Furthermore, HDMI port 710 may mainly exchange video data and audio data with external device 200. USB port 720 may include 4 pins for mainly exchanging data with external device 200. Furthermore, audio port 730 may include 2 pins for exchanging audio data with external device 200. Although FIG. 7 shows coupling interface 180 having HDMI port 710, USB port 720, and audio port 730 to connect user equipment 100 with external device 200, the present invention is not limited thereto.

In accordance with an embodiment of the present invention, user equipment 100 is coupled with external device 200 though coupling interface 180 provided therein. The present invention, however, is not limited thereto. For example, user equipment 100 may be coupled to other electronic devices or appliances such as TV and computer monitors having such HDMI port and/or USB port to output audio/video signals thereto.

In accordance with embodiments of the present invention, user equipment 100 may use constituent elements of external device 200 to perform certain operation such as outputting video and audio data and receiving input from a user after user equipment 100 is connected to external device 200. in order to use the constituent element of external device 200, user equipment 100 may establish data connection to external device 200, exchange constituent element identification information with external device, and reconfigure a control path to control constituent elements of external device 200. Hereinafter, a method for establishing a connection between user equipment and an external device in order to control the external device through the user equipment in accordance with embodiments of the present invention will be described with reference to FIGS. 8A and 8B and FIG. 9. For convenience and ease of understanding, the method will be described as establishing the connection in a docking manner. The present invention, however, is not limited thereto. Such connection may be established in various manners. For example, user equipment 100 may be coupled to external device 200 through a cable or a wireless link. Furthermore, first constituent elements may denote constituent elements of external device 200. Second constituent elements may denote constituent elements of user equipment 100.

Figure 8A:
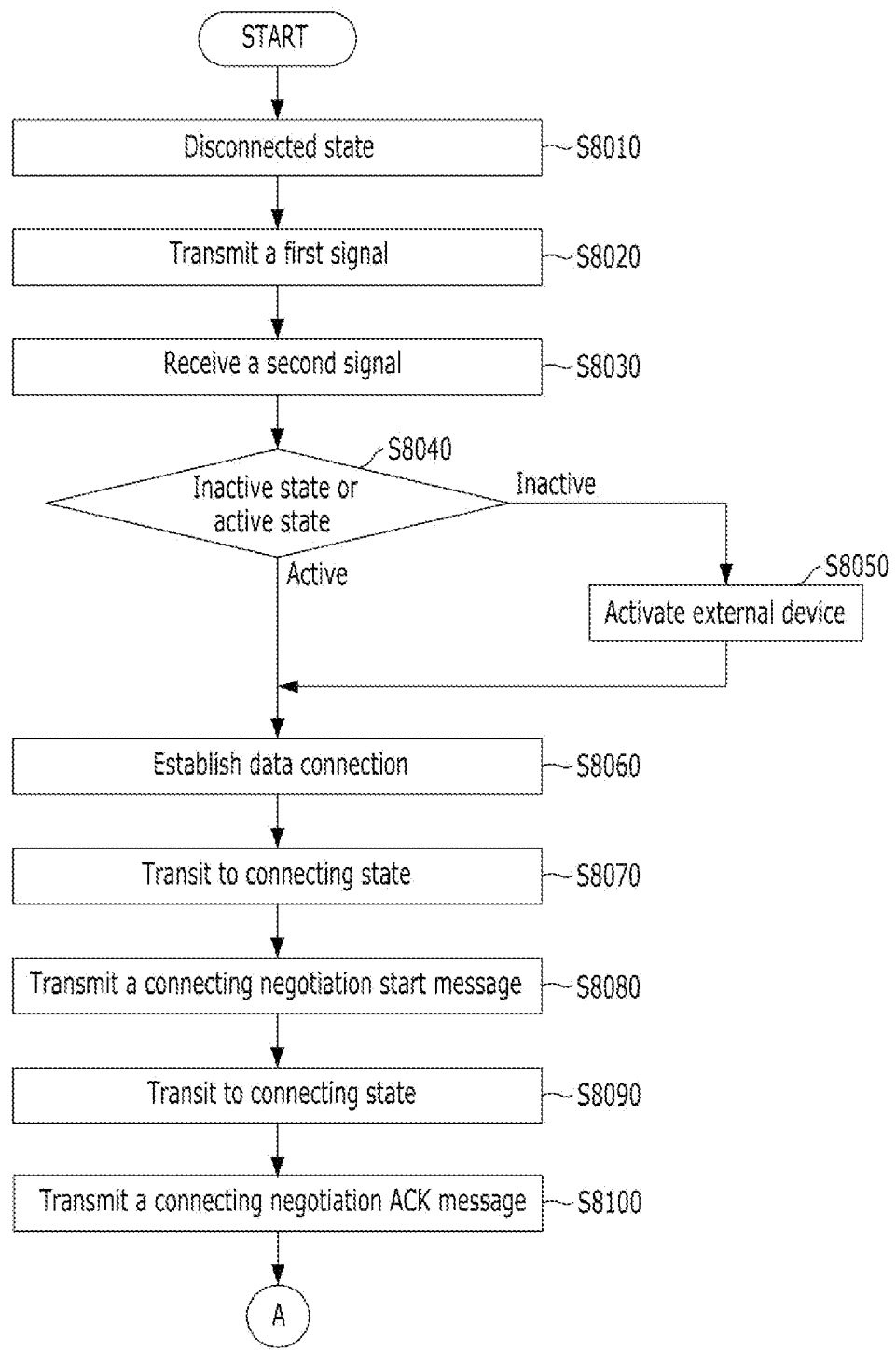
FIGS. 8A and 8B illustrate a method for establishing a connection between user equipment and an external device in order to control the external device through the user equipment in accordance with an embodiment of the present invention.
Figure 8B:
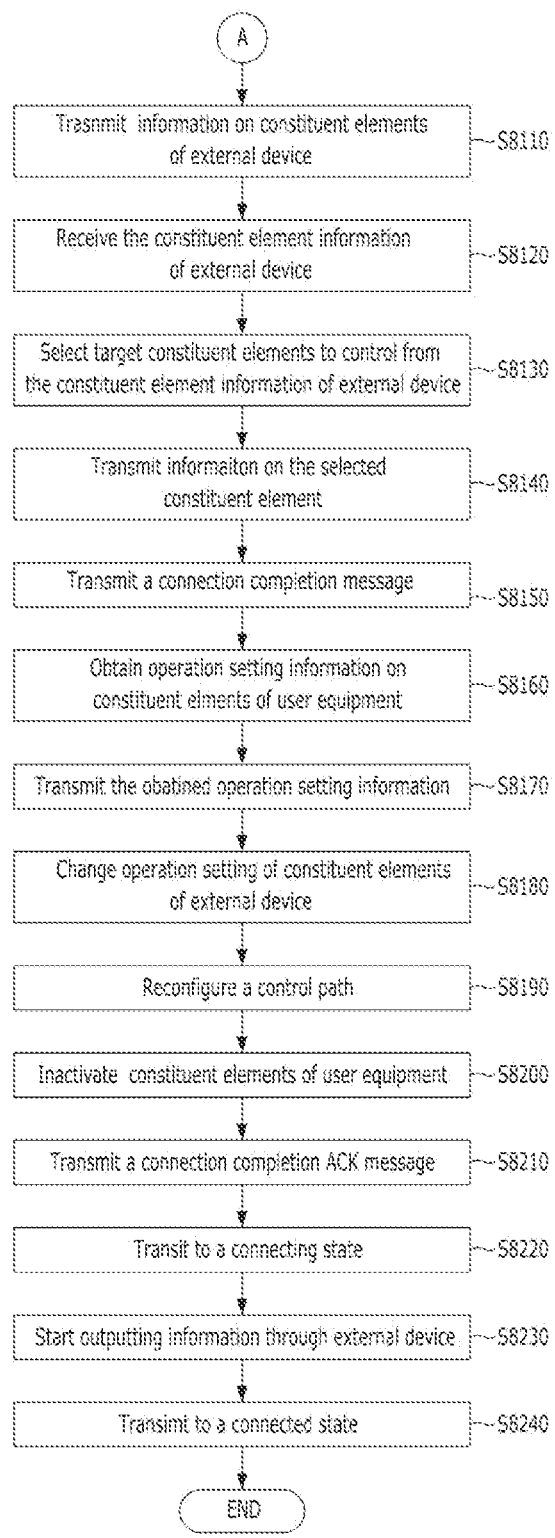

FIGS. 8A and 8B illustrate a method for establishing a connection between user equipment and an external device in order to control the external device through the user equipment in accordance with an embodiment of the present invention.

Referring to FIG. 8A, user equipment 100 and external device 200 may be in a disconnected state at step S8010. For example, when user equipment 100 is not coupled to external device 200, user equipment 100 may be in a disconnected state and external device 200 may be in one of a disconnected state and a power-off state, but the present invention is not limited thereto. Particularly, agent 192 of user equipment 100 and manager 292 of external device 200 may manage states related to connection established between user equipment 100 and external device 200. In accordance with embodiments, user equipment 100 and external device 200 may have at least one of states related to the establishing connection. For example, the states may include a disconnected state, a connecting state, and a connected state. The disconnected state may denote a state of user equipment 100 and external device 200 when the connection between user equipment 100 and external device 200 is not established. The connecting state may denote a state of user equipment 100 or external device 200 when the connection between user equipment 100 and external device 200 is being established. The connected state may denote a state of user equipment 100 or external device 200 when the connection between user equipment 100 and external device 200 is already established.

At step S8020, a first signal may be transmitted from user equipment 100 to external device 200 when user equipment 100 is coupled to external device 200. For example, coupling interface 180 of user equipment 100 may be connected with coupling interface 280 of external device 200. User equipment 100 may include HDMI port 710 as video input/output port 182 as shown in FIG. 4. External device 200 may include the same HDMI port as video input/output port 282 as shown in FIG. 5. When user equipment 100 is placed in coupling bay 251 of external device 200, HDMI port 710 of user equipment 100 is coupled to the same HDMI port, as video input/output port 282, of external device 200. User equipment 100 may be initially configured to supply power through 5V power pin 711 as shown in FIG. 7. Accordingly, when user equipment 100 is coupled to external device 200 in docking manner, power may be supplied to external device 200, as the first signal, through 5V power pin 711. The first signal may enable external device 200 to recognize that user equipment 100 is connected to external device 200.

At step S8030, a second signal may be received in response to the first signal. For example, user equipment 100 may receive the second signal in response to the first signal in accordance with embodiments of the present invention. When external device 200 is supplied with power from user equipment 100, external device 200 may generate the second signal in response to the first signal. Such second signal may be generated and transmitted through a hot plug detect (HPD) pin of HDMI port 282 of the HDMI port. Particularly, the second signal may he generated in hardware manner in accordance with embodiments of the present invention. For example, the HDMI port of external device 200 may be configured to return a part of power supplied through a 5V pin back to user equipment 100. Accordingly, the generation of the second signal may not require external device 200 to be activated. The second signal may enable user equipment 100 to recognize that physical connection is successfully established to external device 200.

External device 200 may be in one of an inactive state and an active state at step S8040. When external device 200 is powered on but in a sleep mode, external device 200 may be in the inactive state. The inactive state may include a sleep_processing state and a sleep state. When external device 200 is powered on and not in the sleep mode, external device 200 may be in the active state.

When external device 200 is in the inactive state (Inactive-S8040), external device 200 may be activated at step S8050. For example, when external device 200 is powered off before user equipment 100 is placed in coupling bay 275, external device 200 may be powered on in response to the first signal and may perform an initiation procedure at the step S8050. Such operation may be a booting operation for booting up external device 200. In this case, the power may be supplied to a power switch circuit of external device 200, external device 200 is powered on, and external device 200 may perform a booting procedure. When external device 200 is in a power_on state but in the sleep state before user equipment 100 is placed in coupling bay 275, external device 200 may be activated (a "wake up") at the step S8050. In the step S8050, external device 200 may transition to a disconnected state. Such state transition may be performed by manager 292 of external device 200, but the present invention is not limited thereto.

When external device 200 is activated (Activated-S8040) or after external device 200 is powered on at the step S8050, a data connection may be established between user equipment 100 and external device 200 at step S8060. Such data connection may enable user equipment 100 and external device 200 to exchange data. The data connection may be established by connecting a USB DM pin and a USB DP pin of a USB port of user equipment 100 with corresponding pins of USB port of external device 200.

At step S8070, external device 200 may transition from the disconnected state to a connecting state. For example, manager 292 of external device 200 may perform such state transition.

At step S8080, external device 200 may transmit a connecting negotiation start message to user equipment 100 in order to continuously perform a connection establish procedure.

At step S8090, user equipment 100 may transition from the disconnected state to a connecting state in response to the connecting negotiation start message from external device 200. As described above, agent 192 of user equipment 100 may transition from the disconnected state to the connecting state in response to the connecting negotiation start message.

At step S8100, user equipment 100 may transmit a connecting negotiation acknowledgment (ACK) message to external device 200 in response to the connection start message.

Referring to FIG. 8B, at step S8110, external device 200 may transmit first constituent element information to user equipment 100 in response to the connecting negotiation ACK message. The first constituent element information may denote information of constituent elements of external device 200. The first constituent element information may include information on constituent elements of external device 200. For example, the constituent elements may be a wireless communication unit, a microphone, a camera, a sensor, a keypad unit, a touch screen, a display unit, an audio output unit, a back light unit, an internal memory. The first constituent element information may include a list of constituent elements and corresponding identification numbers. The first constituent element information may have a form of a table as shown in FIG. 6. The present invention, however, is not limited thereto. Instead of the first constituent element information, external device 200 may transmit identification information of external device 200 to user equipment 100 in response to the connecting negotiation ACK message. In this case, user equipment 100 may include information, such as a table or a database, on various types of external devices connectable to user equipment 100 and constituent elements thereof, which can be controllable. User equipment 100 may identify the connected external device and obtain a list of controllable constituent elements of the connected external device based on the information stored in user equipment 100.

At step S8120, user equipment 100 may receive the first constituent element information from external device 200 and Obtain a list of constituent elements included in external device 200 from the received first constituent element information.

At step S8130, user equipment 100 may select controllable constituent elements from the obtained list of first constituent elements of external device 200. For example, user equipment 100 may select constituent elements to use from the first constituent elements of external device 200. The selected constituent elements might be used instead of constituent elements of user equipment 100 when external device 200 is connected to external device 200.

At step S8140, user equipment 100 may transmit information on the selected first constituent elements to external device 200. For example, such information may be a list of identification numbers of the selected first constituent.

At step S8150, external device 200 may transmit a connection completion message to user equipment 100 upon the receipt of the information on the selected first constituent elements.

At step S8160, user equipment 100 may obtain operation setting information on second constituent elements of user equipment 100, corresponding to the selected first constituent elements of external device 200. The second constituent elements corresponding to the selected first constituent elements may have the same type of constituent elements. For example, the corresponding second constituent elements may have the same identification number of the selected first constituent elements. The operation setting information may be information on settings of corresponding constituent elements performing certain operations. That is, the operation setting information may include information on setting properties such as a volume level, a power on/off state, a brightness level, and the like.

At step S8170, user equipment 100 may transmit the obtained operation setting information to external device 200. At step S8180, operation setting of the first constituent elements of external device 200 may be changed based on the operation setting information of the second constituent elements of user equipment 100. For example, the operation settings of the first constituent elements may be synchronized with the operation settings of the second constituent elements of user equipment 100 based on the received operation setting information. That is, the first constituent elements and the second constituent elements may be synchronized in operation state. For example, audio output unit 165 of user equipment 100 may be set up with a volume level of 5 before user equipment 100 is connected to external device 200. After user equipment 100 is connected to external device 200, corresponding audio output unit 265 of external device 200 may be synchronized to be set with the volume level of 5. Display unit 160 of user equipment 100 is set up with a brightness level of 4 before user equipment 100 is connected to external device 200. After user equipment 100 is connected to external device 200, display unit 260 of external device 200 may be synchronized to have a brightness level of 4 identical to the brightness level of display unit 160 of user equipment 100. Accordingly, second constituent elements of user equipment 100 and first constituent elements of external device 200 may perform operation with identical settings. Users might not be required to reconfigure the setting properties of first constituent elements of external device 200 after user equipment 100 is connected to external device 200.

At step S8190, a control path of constituent elements ay be reconfigured. For example, a control path of controlling second constituent elements of user equipment 100 may be reconfigured to control corresponding first constituent elements of external device 200 after user equipment 100 is connected to external device 200. Control of constituent elements may include event control and command control. The event control may be operations for controlling and processing an event generated in constituent elements. The event may be an event signal generated in response to inputs from a user. The command control may be operations for instructing constituent elements to perform a certain operation. As an example for event control, a key input is received through a touch panel, a corresponding event handler may be called in response to the received key input, and the event handler may perform related operations according to the key input. As an example for command control, a turn-on command is transmitted to backlight unit 170 and backlight unit 170 is controlled to be turned on.

Before user equipment 100 is connected to external device 200, second constituent elements of user equipment 100 may generate events in response to inputs from a user and the generated events may be transferred to controller 192. After user equipment 100 is connected to external device 200, first constituent elements of external device 200 may generate events in response to inputs from a user and the generated events may be required to be transferred to user equipment 100, for example, controller 192 of user equipment 100. Accordingly, user equipment 100 may need to reconfigure an event control path for receiving an event generated in first constituent elements of external device and transferring the generated event to controller 192 of user equipment 100.

Before user equipment 100 is connected to external device 200, user equipment 100 may transmit a certain command generated in controller 192 to second constituent elements of user equipment 100. After user equipment 100 is connected to external device 200, user equipment 100 may need to transmit a certain command generated in controller 192 to first constituent elements of external device 200. Accordingly, user equipment 100 might be required to reconfigure the command control path as well.

Such reconfiguration of control path may be performed by agent 192 and control path manager 194 in accordance with embodiments of the present invention. For example, after user equipment 100 is connected to external device 200, control path manager 194 may receive data generated in controller 190 of user equipment 100, including commands and/or control data and transfer the generated data to agent 192. Agent 192 may receive the generated data from control path manager 194 and transfer the received data to external device 200 through coupling interface unit 180. Furthermore, agent 192 may receive events generated in first constituent elements of external device 200 and transfer the generated events to control path manager 194 after user equipment 100 is connected to external device 200. Control path manager 194 may receive the generated events from agent 192 and transfer the received event to controller 190 of user equipment 100.

When user equipment 100 is not connected to external device 200, control path manager 194 may receive data from controller 192 and transfer the received data directly to second constituent elements of user equipment 100 instead of transferring the received data to agent 192. Furthermore, control path manager 194 n ay receive data directly from constituent elements of user equipment 100 and transfer the received data to controller 192.

Such reconfiguration of control path may be performed in real time in accordance with embodiments of the present invention. Furthermore, user equipment 100 may include both control paths for receiving or transmitting data from or to user equipment 100 and external device 200. In this case, user equipment 100 may select one of the control paths according to whether user equipment 100 is connected to external device 200. Such reconfiguration of control path is described subsequently in detail with reference to FIG. 10 and FIG. 11.

At step S8200, the second constituent elements of user equipment 100 may be inactivated after reconfiguring the control path. For example, user equipment 100 may suspend the second constituent elements or power off the second constituent elements.

At step S8210, a connection completion ACK message may be transmitted. For example, user equipment 100 may transmit the connection completion ACK message to external device 200 in order to inform external device 200 of completion of establishing connection to external device 200.

At step S8220, user equipment 100 may transition from the connecting state to a connected state. At step S8230, external device 200 may start outputting information through external device 200 in response to the control of user equipment 100. For example, external device 200 may start receiving video and/or audio data from user equipment 100 with control data and start outputting the received video and/or audio data through elated first constituent elements of external device 200. For example, external device 200 may receive HDMI signals from user equipment 100 and display the received HDMI signal on display unit 260 of external device 200.

At step S8240, external device 200 may transition from the connecting state to a connected state. In response to the connection completion ACK message, external device 200 may transition to the connected state. Such operation may be performed simultaneously at the step S8230 or before starting outputting the received information at the step S8230.

As described above, when user equipment 100 is connected to external device 200, the control path may be reconfigured to control first constituent elements of external device 200 instead of controlling corresponding second constituent elements of user equipment 100. When user equipment 100 is disconnected from external device 200, such a control path may be reconfigured back to an original control path. Such a method for disconnecting user equipment 100 from external device 200 is described subsequently with reference to FIG. 9.

FIG. 9 shows a method for disconnecting user equipment from an external device in accordance with embodiments of the present invention.

Referring to FIG. 9, user equipment 100 and external device 200 may be in the connected state at step S9010. For example, user equipment 100 may control first constituent elements of external device 200 through the reconfigured control path when user equipment 100 and external device 200 are in the connected state.

At step S9020, user equipment 100 may sense releasing from external device 200 when user equipment 100 is disconnected from external device 200. For example, user equipment 100 may sense such releasing based on a HPD release signal, a USB reset signal, and/or a 5V power release signal.

At step S9030, user equipment 100 may restore an original control path. For example, upon the sensing, user equipment 100 may restore the original control path for controlling second constituent elements of user equipment 100 instead of controlling corresponding first constituent elements of external device 200. When second constituent elements of user equipment 100 are inactivated, user equipment 100 may activate second constituent elements at the step S9030.

At step S9040, user equipment 100 may transit from the connected state to a connection release state. After the activation of the second constituent elements of user equipment 100, user equipment 100 may transit to the connection release state.

At step S9050, external device 200 may sense releasing from user equipment 100. For example, external device 200 may sense the releasing when power supplied through 5V power pin is interrupted.

At step S9060, external device 200 may inactivate first constituent elements of external device 200. For example, external device 200 may turn off or suspend first constituent elements of external device 200.

At step S9070, the data connection may be released. For example, external device 200 may reset USB VBUS 712 (FIG. 7) and release the connection of USB DP 723 (FIG. 7) and USB DM pin 724 (FIG. 7). At step S9080, external device 200 may transition from the connected state to the connection release state.

Figure 10:
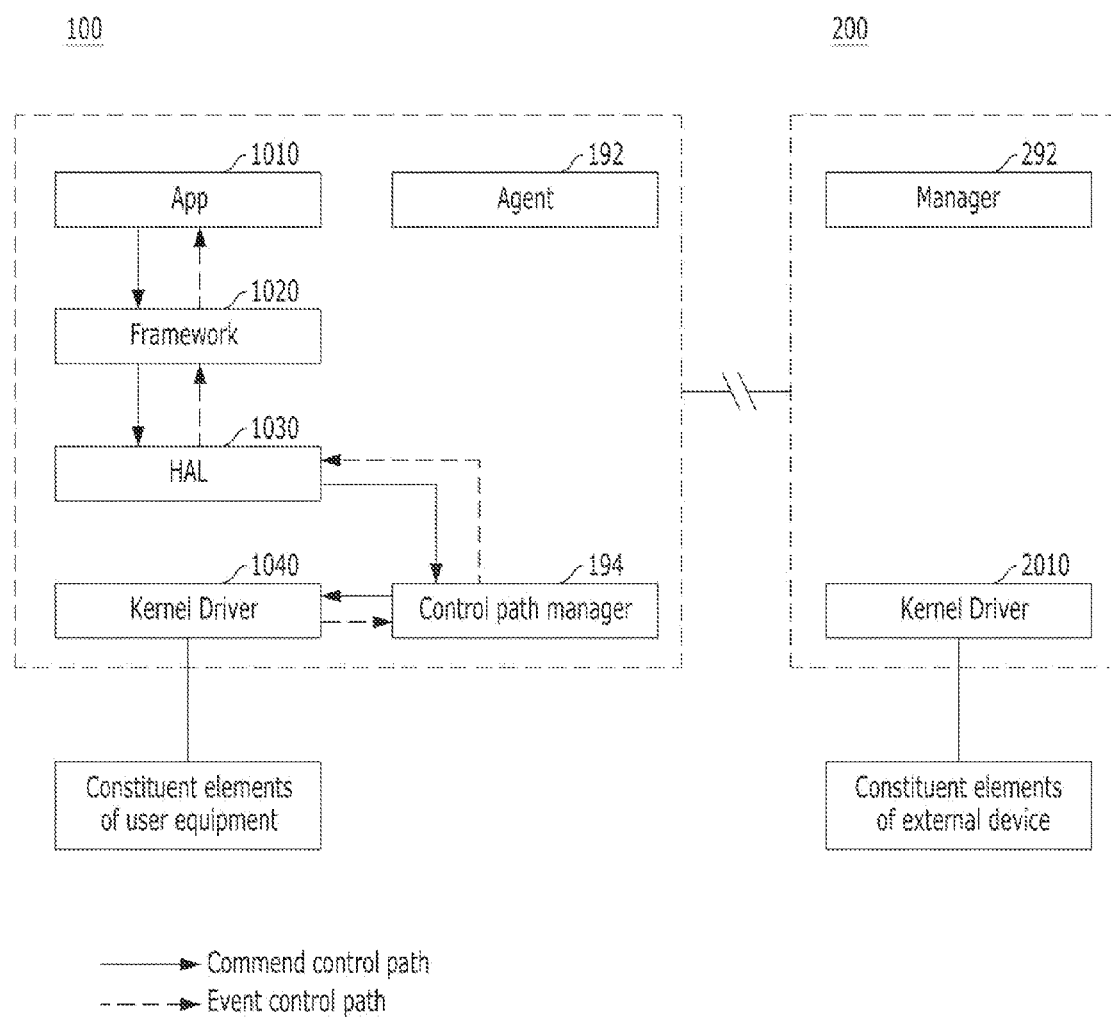
FIG. 10 shows a control path of user equipment and an external device when user equipment is not connected to an external device in accordance with embodiments of the present invention.
Figure 11:
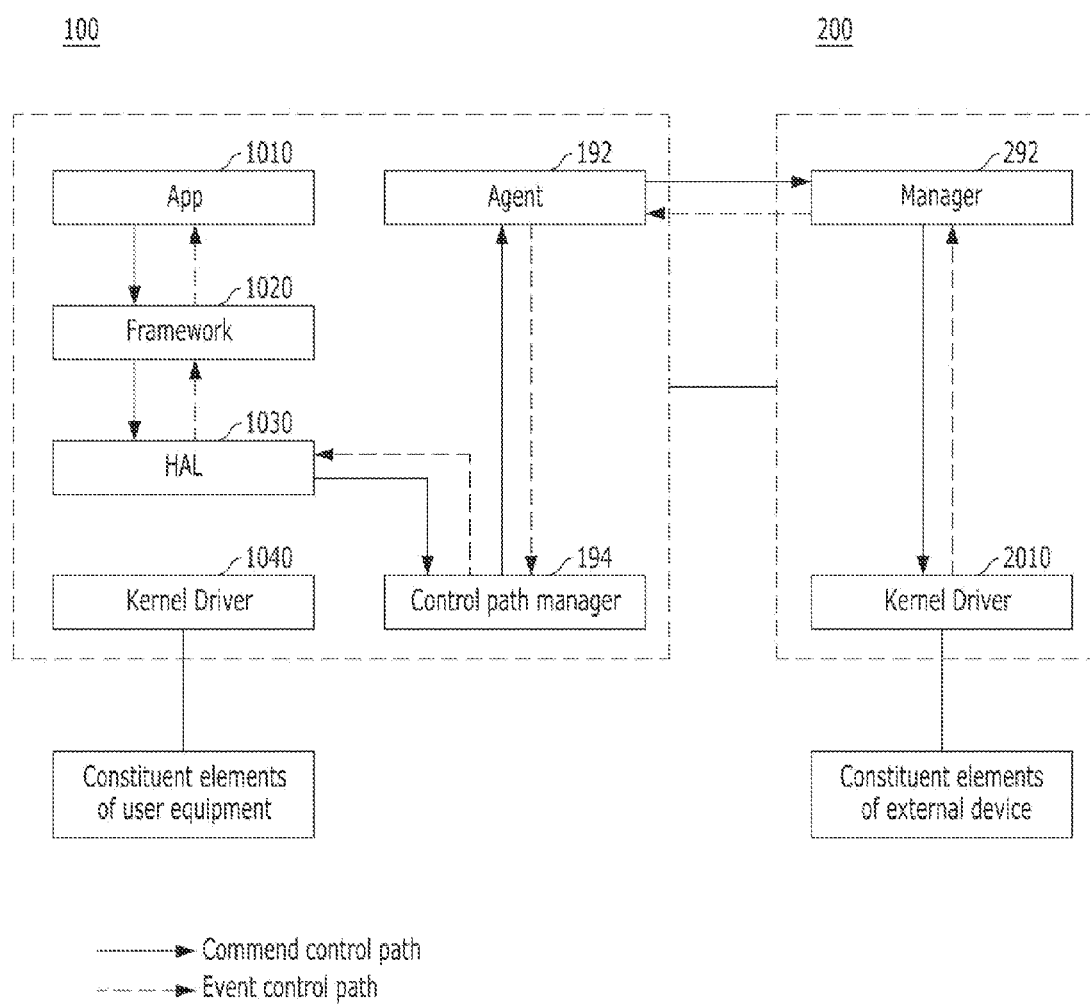
FIG. 11 shows a control path of user equipment and an external device when the user equipment is connected to external device in accordance with an embodiment of the present invention.

As described above, user equipment 100 may restore the original control path when user equipment 100 is disconnected from external device 200 and control second constituent elements of user equipment 100 instead of controlling first constituent elements of external device 200. That is, after user equipment 100 is released from external device 200, user equipment 100 may control second constituent elements of user equipment 100 by restoring the original control path. Hereinafter, an operation for controlling a control path in accordance with embodiment of the present invention is described with reference to FIGS. 10 and 11. In FIG. 10 and FIG. 11, a solid arrow line may denote a command control path and a dotted arrow line may denote an event control path.

FIG. 10 shows a control path of user equipment and an external device when user equipment is not connected to an external device in accordance with embodiments of the present invention.

Referring to FIG. 10, before connection is established between user equipment 100 and external device 200, user equipment 100 (having agent 192) may control constituent elements of user equipment 100 through a control path formed between application (APP) layer 1010 to second constituent elements of user equipment 100 through control path manager 194. The control path may include a command control path expressed as a solid arrow line and an event control path expressed as a dotted arrow line. in case of the command control path, APP layer 1010 may generate a command with related data, as a result of certain operation, for controlling a certain constituent element of user equipment 100. The generated command may be transferred to control path manager 194 passing through framework layer 1020 and hardware abstraction layer (HAL) 1030. The control path manager 194 may transfer the command with related data to kernel driver 1040. Kernel deriver 1040 may control or transfer the related data to a related constituent element of user equipment 100. As shown in FIG. 10, control path manager 194 may transfer the generated command with related data to kernel driver 1040 when user equipment 100 is not connected to external device 200.

In case of the event control path, kernel driver 1040 may receive an event signal generated in constituent elements of user equipment 100 and transfer the received event signal to control path manager 194. Control path manager 194 may transfer the received event signal to APP layer 1010 through HAL 1030 and framework 1020 when user equipment 100 is not connected to external device 200. APP layer 1010 may receive the event signal and perform a related operation in response to the event signal.

FIG. 11 shows a control path of user equipment and an external device when the user equipment is connected to external device in accordance with an embodiment of the present invention.

Referring to FIG. 11, when user equipment 100 is connected to external device 200, a control path may be formed between APP layer 1010 in user equipment 100 and constituent elements of external device 200 through manager 292, agent 192, and control path manager 194 unlike the control path shown FIG. 10. In case of a command control path, APP layer 1010 may generate a command with related data and transfer the generated command with related data to control path manager 194 through framework layer 1020 and HAL 1030. Since user equipment 100 is connected to external device 200, control path manager 194 may transfer the received command with related data to agent 192 instead of kernel driver 1040. Agent 192 may receive the command with related data from control path manager 194 and transfer the received command with related data to manager 292 of external device 200 through coupling interfaces 180 and 280. Manager 292 may transfer the received command with related data to kernel driver 2010 of external device 200. Kernel driver 2010 of external device 200 may control constituent elements of external device 200 based on the received command with the related data.

In case of an event control path, manager 292 may receive an event signal generated in constituent elements of external device 200 through kernel driver 2010. Manager 292 may transfer the received event signal to agent 192 through coupling interfaces 180 and 280. Agent 192 may transfer the received event signal to control path manager 194 and control path manager 194 may transfer the received event signal to APP layer 1010.

As described above, control path manager 194 may change the control path to transfer the data such as commands to agent 192 when user equipment 100 is connected to external device 200. Agent 192 may transfer such data to manager 292 in order to control constituent elements of external device 200. Furthermore, control path manager 194 may change the control path to receive the event signal generated in constituent elements of external device 200 when user equipment 100 is connected to external device 200. Control path manager 194 may receive the event signal from manager 292 through agent 192 and transfer the event signal to APP layer 1010 of user equipment 100. Accordingly, user equipment 100 may control constituent elements of external device 200 in response to inputs made on constituent elements of external device 200.

In accordance with embodiments of the present invention, agent 192 may register a certain module or a certain function at control path manager 194 in order to receive commands with associated data from control path manager 194. Control path manager 194 may transfer control commands by calling the registered certain module or the registered certain function. Particularly, in the initiation procedure, a module of kernel driver 1040 for controlling second constituent elements of user equipment 100 may be registered at control path manager 194. Also, a module of agent 192 may be registered at control path manager 194. Control path manager 194 may select one of the kernel driver module and the agent module according to whether user equipment 100 is connected to external device 200. For example, control path manager 194 may select the kernel driver module when user equipment 100 is not connected to external device 200. Control path manager 194 may select the agent module when user equipment 100 is connected to external device 200.

In accordance with another embodiment of the present invention, agent 192 may inform control path manager 194 of event generation by calling a certain module realized in control path manager 194. In this case, control path manager 194 may select one of an event from kernel driver 1040 and an event from agent 192 according to whether user equipment 100 is connected to external device 200. After selection, control path manager 194 may transfer the selected event to a handler that processes such event. The handler may be implemented in control path manager 194 or in other layer.

Control path manager 194 may be implemented in APP layer 1010, but the present invention is not limited thereto. Control path manager 194 may be implemented in HAL 1030. Furthermore, agent 192 may be implemented in APP layer 1010, but the present invention is not limited thereto. Agent 192 may be implemented in framework layer 1020, HAL 1030, or kernel layer. Manager 292 may be implemented in an application layer, but the present invention is not limited thereto. Manager 292 may be implemented in framework layer 1020 or HAL 1030.

In FIG. 10 and FIG. 11, control path manager 194 and agent described as independent units. The present invention, however, is not limited thereto. For example, control path manager 194 and agent 192 may be implemented as one unit in controller 190. In this case, controller 190 may be implemented in a kernel layer. That is, all elements related to transferring commands and event signals, such as control path manager 194, agent 192, and controller 190, may be implemented in one layer or distributed through multiple layers. It may depend on what is more important between comparability and processing speed. That is, when the all elements are implemented in the kernel layer, a control path may become shorter. Accordingly, the processing speed may increase. When the all elements are distributed in multiple layers such as API layer 1010 and kernel layer 1040, such configuration may be advantageous in development and comparability.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to opera e internally in a manner specified by the standard.

No claim element herein is to be construed under the provisions of 35 U.S.C. §112, sixth paragraph, unless the element is expressly recited using the phase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly; various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for establishing a connection between user equipment including second constituent elements and an external device including first constituent elements and controlling the external device, the method comprising:
   sensing the connection to the external device;
   obtaining a first constituent element identification table from the external device through the connection, wherein the first constituent element identification table includes a corresponding constituent element identification number for each first constituent element of the external device;
   selecting target constituent elements to control from the first constituent elements of the external device according to a constituent element identification number comparison between the first constituent element identification table and a second constituent element identification table, wherein the second constituent element identification table is stored in the user equipment and includes a corresponding constituent element identification number for each second constituent element of the user equipment;
   reconfiguring a control path for controlling the selected target constituent elements of the external device; and
   controlling the selected target constituent elements of the external device through the reconfigured control path,
   wherein the corresponding constituent element identification number is an identification value differently defined according to a constituent element type, and does not represent a constituent element connection status; and
   wherein the selecting includes:
      comparing constituent element identification numbers included in the first constituent element identification table and constituent element identification numbers included in the second constituent element identification table;
      selecting constituent elements having the same constituent element identification numbers from the first constituent elements, according to a result of the constituent element identification number comparison; and
      determining the selected constituent elements as the target constituent elements to control.

2. The method of claim 1, wherein the sensing the connection to the external device includes:
   supplying power to the external device when a coupling interface of the user equipment is physically connected to a corresponding coupling interface of the external device;
   receiving a signal from the external device in response to the supplied power; and
   determining the connection is established to the external device upon the receipt of the signal,
   wherein the signal is generated in hardware by returning a part of the supplied power through the coupling interfaces.

3. The method of claim 1, further comprising:
   obtaining operation setting of the second constituent elements; and
   synchronizing operation setting of the selected target constituent elements with the obtained operating setting of the second constituent elements.

4. The method of claim 1, wherein the reconfiguring a control path includes:
   reconfiguring a command control path for transferring commands with associated data, generated in the user equipment, to at least one of the selected target constituent elements of the external device; and
   reconfiguring an event control path for receiving event signals generated in at least one of the selected target constituent elements of the external device.

5. The method of claim 4, wherein the controlling the selected target constituent elements of the external device includes:
   generating the command with associated data, as results of performing associated applications installed in a controller of the user equipment;
   transmitting the generated command with associated data to at least one of the selected target constituent elements of the external device through the reconfigured command path; and outputting the associated data through at least one of the selected target constituent elements based on the command.

6. The method of claim 4, wherein the controlling the selected target constituent elements of the external device includes:
receiving the event signal generated in at least one of the selected target constituent elements of the external device through the reconfigured event control path; and
performing an associated application in response to the event signal.

7. The method of claim 1, further comprising:
activating the external device with the first constituent elements after sensing the connection established between the user equipment and the external device.

8. The method of claim 1, further comprising:
inactivating the second constituent elements of the user equipment after the selecting target constituent elements.

9. The method of claim 1, further comprising:
sensing releasing of the connection established between the user equipment and the external device;
reconfiguring the reconfigured control path back to an original control path; and
controlling the second constituent elements of the user equipment through the original control path.

10. The method of claim 9, wherein the reconfiguring the reconfigured control path includes:
reconfiguring a command control path for transferring commands with associated data, generated in the user equipment, to at least one of the second constituent elements of the user equipment; and
reconfiguring an event control path for receiving event signals generated in at least one of the second constituent elements of the user equipment.

11. User equipment connectable to an external device including first constituent elements, the user equipment comprising:
a coupling interface configured to sense connection established to the external device;
a plurality of second constituent elements each configured to perform an associated operation in response to at least one of a command and an event signal generated in response to an input from a user; and
a controller configured to control the first constituent elements of the external device by reconfiguring a control path for transferring commands with associated data, generated as results of operations and receiving event signals generated in response to inputs from a user,
wherein the controller is further configured (i) to obtain a first constituent element identification table including a corresponding constituent element identification number for each first constituent element, from the external device, and (ii) to perform a selection procedure of target constituent elements to be controlled from the first constituent elements, according to a constituent element identification number comparison between the first constituent element identification table and a second constituent element identification table, wherein the second constituent element identification table is stored in the user equipment and includes a corresponding constituent element identification number for each second constituent element of the user equipment;
wherein the constituent element identification number is an identification value differently defined according to a constituent element type, and does not represent a constituent element connection status; and
wherein the selection procedure includes:
comparing constituent element identification numbers included in the first constituent element identification table and constituent element identification numbers included in the second constituent element identification table;
selecting constituent elements having the same constituent element identification numbers from the first constituent elements, according to a result of the constituent element identification number comparison; and
determining the selected constituent elements as the target constituent elements to control.

12. The user equipment of claim 11, wherein the coupling interface includes:
at least one port configured to:
supply power to the external device when the coupling interface is physically connected to a corresponding coupling interface unit of the external device; and
receive a signal from the external device in response to the supplied power, wherein the corresponding coupling interface of the external device generates the signal in hardware by returning a part of the supplied power.

13. The user equipment of claim 11, wherein the controller includes:
a control path manager configured to:
reconfigure an initial command control path for transferring commands with associated data, which is generated by an application installed in the controller of the user equipment, to at least one of the first constituent elements of the external device when the user equipment is connected to the external device through the corresponding coupling interfaces;
reconfigure an initial event control path that receives event signals generated in at least one of the first constituent elements of the external device when the user equipment is connected to the external device through the corresponding coupling interfaces;
reconfigure the reconfigured command control path back to the initial command control path for transferring commands with associated data to at least one of the second constituent elements; and
reconfigure the reconfigured event control path back to the initial event control path for receiving event signals generated in at least one of the second constituent elements.

14. The user equipment of claim 11, wherein the controller includes:
an agent configured to transfer the command with related data to the external device and to receive the event signals from the external device when the user equipment is connected to the external device; and
a control path manager configured to transfer the command with related data to the agent when the user equipment is connected to the external device, to transfer the command with related data to at least one of the second constituent elements when the user equipment is disconnected from the external device, to receive the event signal from the agent and transfer the received signal to the controller when the user equipment is connected to the external device, and to receive the event signal from at least one of the second constituent elements and transfer the received event signal to the controller.

15. The user equipment of claim 14, wherein:
the controller is configured to register a first module at the control path manager;

the agent is configured to register a second module at the control path manager; and the control path is configured to call the first module to transfer the command with related data to the controller when the user equipment is disconnected from the external device and to call the second module to transfer the command with related data to the agent.

16. The user equipment of claim 13, wherein the controller is configured to:

generate the command with associated data, as results of performing associated applications installed in the controller; and transmit the generated command with associated data to at least one of the first constituent elements of the external device through the reconfigured command path, wherein the at least one of the first constituent elements of the external device is controlled to output the associated data based on the command.

17. The user equipment of claim 13, wherein the controller is configured to:

receive the event signals from the external device through the reconfigured event control path; and perform an associated application in response to the received event signal, wherein the event signals are generated in at least one of the first constituent elements of the external device in response to inputs from a user.

18. The user equipment of claim 12, wherein the controller is configured to:

obtain operating setting of the second constituent elements; and synchronize operating setting of the selected target constituent elements with obtained operating setting of the second constituent elements.

* * * * *